United States Patent
Sahin et al.

(10) Patent No.: US 10,129,065 B2
(45) Date of Patent: Nov. 13, 2018

(54) TAIL CANCELATION AND ADDITION OF UNIQUE WORD FOR ORTHOGONAL FREQUENCY DIVISION MULTIPLEXING

(71) Applicant: IDAC HOLDINGS, INC., Wilmington, DE (US)

(72) Inventors: Alphan Sahin, Westbury, NY (US); Rui Yang, Greenlawn, NY (US); Fengjun Xi, San Diego, CA (US); Oghenekome Oteri, San Diego, CA (US); Hanqing Lou, Syosset, NY (US); Robert L. Olesen, Huntington, NY (US)

(73) Assignee: IDAC Holdings, Inc., Wilmington, DE (US)

( * ) Notice: Subject to any disclaimer, the term of this patent is extended or adjusted under 35 U.S.C. 154(b) by 0 days.

(21) Appl. No.: 15/742,329

(22) PCT Filed: Jul. 7, 2016

(86) PCT No.: PCT/US2016/041284
§ 371 (c)(1),
(2) Date: Jan. 5, 2018

(87) PCT Pub. No.: WO2017/007900
PCT Pub. Date: Jan. 12, 2017

(65) Prior Publication Data
US 2018/0198662 A1    Jul. 12, 2018

Related U.S. Application Data

(60) Provisional application No. 62/190,512, filed on Jul. 9, 2015, provisional application No. 62/260,008, filed on Nov. 25, 2015.

(51) Int. Cl.
*H04L 27/26* (2006.01)
*H04L 25/03* (2006.01)
(Continued)

(52) U.S. Cl.
CPC ...... *H04L 27/2636* (2013.01); *H04L 25/0216* (2013.01); *H04L 25/03834* (2013.01); *H04L 27/2605* (2013.01); *H04J 11/0033* (2013.01)

(58) Field of Classification Search
CPC ............ H04L 27/2636; H04L 25/0216; H04L 25/03834; H04L 27/2605; H04J 11/0033
See application file for complete search history.

(56) References Cited

U.S. PATENT DOCUMENTS

| | | |
|---|---|---|
| 9,071,391 B2 | 6/2015 | Noh et al. |
| 9,178,737 B2 | 11/2015 | Fechtel |

(Continued)

FOREIGN PATENT DOCUMENTS

| | | |
|---|---|---|
| WO | 14/124661 | 8/2014 |

OTHER PUBLICATIONS

3GPP Website, "RAN 5G Workshop—The Start of Something," Phoenix, AZ, USA (Sep. 19, 2015) available at http://www.3gpp.org/news-events/3gpp-news/1734-ran_5g (last visited Apr. 5, 2018).

(Continued)

*Primary Examiner* — Jaison Joseph
(74) *Attorney, Agent, or Firm* — Volpe and Koenig, P.C.

(57) ABSTRACT

Precoding, a symbol permutation operation, or pulse shaping may be used to suppress or cancel a tail or head of a symbol. Precoding may include utilization of a suppression vector. A unique word (UW) may be added to the suppression vector before spreading. The symbol and values of the suppression vector may be spread by a spreading function(s) and may be shaped prior to transmission.

20 Claims, 14 Drawing Sheets

(51) Int. Cl.
    H04L 25/02    (2006.01)
    H04J 11/00    (2006.01)

(56) References Cited

U.S. PATENT DOCUMENTS 9,544,173 B1* 1/2017 Berardinelli ........ H04L 27/2613
2017/0207941 A1* 7/2017 Park .................... H04L 27/2605

OTHER PUBLICATIONS

Berardinelli et al., "On the Potential of Zero-Tail DFT-Spread-OFDM in 5G Networks," Proceedings of the IEEE Vehicular Technology Conference (VTC) (Sep. 2014).
Berardinelli et al., "Zero-tail DFT-spread-OFDM signals," Proceedings of IEEE Globecom Workshops (Dec. 2013).
Huemer et al., "Design and analysis of UW-OFDM signals," AEU—International Journal of Electronics and Communications, vol. 68, Issue 10, pp. 958-968 (Oct. 2014).
Huemer et al., "Non-Systematic Complex No. RS Coded OFDM by Unique Word Prefix," IEEE Transactions on Signal Processing, vol. 60, No. 1, pp. 285-299, (Jan. 2012).
IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, IEEE P802.11ad-2012 (Dec. 2012).
Interdigital Communications, "Design considerations on waveform in UL for New Radio systems," 3GPP TSG RAN WG1 Meeting #84bis, R1-162925, Busan, Korea (Apr. 11-15, 2016).
Interdigital Communications, "Performance Evaluation of UW DFT-S-OFDM Waveform for UL," 3GPP TSG RAN WG1 Meeting #85, R1-165057, Nanjing, China (May 23-27, 2016).
Michailow et al., "Generalized Frequency Division Multiplexing for 5th Generation Cellular Networks," IEEE Transactions on Communications, vol. 62, No. 9 (Sep. 2014).
Michailow et al., "Generalized Frequency Division Multiplexing: Analysis of an Alternative Multi-Carrier Technique for Next Generation Cellular Systems," IEEE International Symposium on Wireless Communication Systems (ISWCS), pp. 171-175 (Aug. 2012).
Pancaldi et al., "Single carrier Frequency Domain Equalization," IEEE Signal Processing Magazine (Sep. 2008).
Sahin et al., "An Improved Unique Word DFT-Spread OFDM Scheme for 5G Systems," IEEE Globecom Workshops (Dec. 2015).

* cited by examiner

TAIL CANCELATION AND ADDITION OF UNIQUE WORD FOR ORTHOGONAL FREQUENCY DIVISION MULTIPLEXING

CROSS REFERENCE TO RELATED APPLICATIONS

This application is the U.S. National Stage, under 35U.S.C. § 371, of International Application No. PCT/US2016/041284 filed Jul. 7, 2016, which claims the benefit of U.S. Provisional Application Ser. No. 62/190,512 filed Jul. 9, 2015 and U.S. Provisional Application Ser. No. 62/260,008 filed Nov. 25, 2015, the content of which are hereby incorporated by reference herein.

BACKGROUND

Frequency division multiple access (FDMA) or orthogonal frequency-division multiplexing (OFDM) waveforms may utilize redundancy schemes such as cyclic prefixes (CPs) or null subcarriers to account for variable channel delay spreads in order to provide reliable communications. However, resources and energy may be wasted since a CP size is sometimes fixed and determined by a worst channel delay spread of a cell at a particular time. A CP also wastes energy since CP duration is unused and the CP is discarded at a receiver. The CP size may also need to be communicated to a wireless transmit/receive unit (WTRU) before transmissions begin in a cell creating overhead and connection delays. Thus, CPs consume extra energy, waste resources, and create overhead.

Furthermore, to achieve reliable communications, low peak-to-average power ratio (PAPR) characteristics, lower out-of-band (OOB) leakage, very high data rates, and better quality of experience (QoE), next generation of wireless and wired networks utilizing FDMA or OFDM will require improved management of different delay spreads and other channel conditions. Thus, it is desirable to have FDMA or OFDM communications that account for delay spreads with better resource management and reduced signaling overhead.

SUMMARY

Precoding, a symbol permutation operation, or pulse shaping may be used to suppress or cancel a tail or head of a symbol. Precoding may include utilization of a suppression vector. A unique word (UW) may be added to the suppression vector before spreading. The symbol and values of the suppression vector may be spread by a spreading function(s) and may be shaped prior to transmission.

BRIEF DESCRIPTION OF THE DRAWINGS

A more detailed understanding may be had from the following description, given by way of example in conjunction with the accompanying drawings wherein.

DETAILED DESCRIPTION

For the methods and processes described below, the steps recited may be performed out of sequence in any order and sub-steps not explicitly described or shown may be performed. In addition, "coupled", "operatively coupled", "in communication", etc. may mean that objects are linked but may have zero or more intermediate objects between the linked objects. Also, any combination of the disclosed features/elements may be used in one or more embodiments. When using referring to "A or B", it may include A, B, or A and B, which may be extended similarly to longer lists. When using the notation X/Y it may include X or Y. Alternatively, when using the notation X/Y it may include X and Y. X/Y notation may be extended similarly to longer lists with the same explained logic. Lastly, any elements shown or described in the figures herewith may be implemented by one or more functions or components on hardware, software, firmware, or the like.

In the forthcoming examples, tail or head suppression configurations are given for discrete Fourier transform spread (DFT-S) orthogonal frequency-division multiplexing (OFDM) information or streams. However, the tail or head suppression configurations may be equivalently or substantially equivalently be applied to DFT-S symbols, data, information, control information, or the like.

Figure 1A:
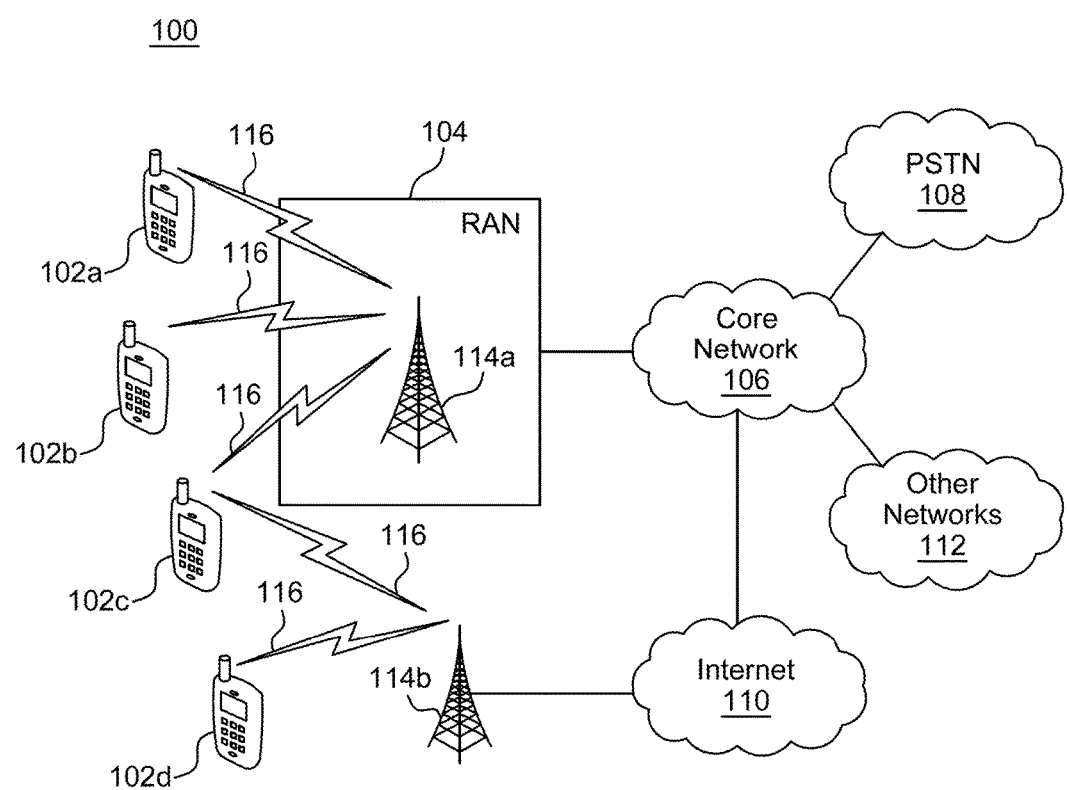
FIG. 1A is a diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. Communications system 100 may enable multiple wireless users to access such content through the sharing of system resources, including wireless bandwidth. For example, communications system 100 may employ one or more channel access methods, such as code division multiple access (CDMA), time division multiple access (TDMA), frequency division multiple access (FDMA), orthogonal FDMA (OFDMA), single-carrier FDMA (SC-FDMA), or the like.

As shown in FIG. 1A, communications system 100 may include wireless transmit/receive units (WTRUs) 102a, 102b, 102c, 102d, radio access network (RAN) 104, core network 106, public switched telephone network (PSTN) 108, Internet 110, and other networks 112, though it will be appreciated that the disclosed embodiments contemplate any number of WTRUs, base stations, networks, and/or network elements. Each of WTRUs 102a, 102b, 102c, 102d may be any type of device configured to operate and/or communicate in a wireless environment. By way of example, WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, or the like.

Communications system 100 may also include base station 114a and base station 114b. Each of base stations 114a, 114b may be any type of device configured to wirelessly interface with at least one of WTRUs 102a, 102b, 102c, 102d to facilitate access to one or more communication networks, such as core network 106, Internet 110, and/or other networks 112. By way of example, base stations 114a, 114b may be a base transceiver station (BTS), a Node-B, an eNode B, a Home Node B, a Home eNode B, a site controller, an access point (AP), a wireless router, or the like. While base stations 114a, 114b are each depicted as a single element, it will be appreciated that base stations 114a, 114b may include any number of interconnected base stations and/or network elements.

Base station 114a may be part of RAN 104, which may also include other base stations and/or network elements (not shown), such as a base station controller (BSC), a radio network controller (RNC), relay nodes, etc. Base station 114a and/or base station 114b may be configured to transmit and/or receive wireless signals within a particular geographic region, which may be referred to as a cell (not shown). The cell may further be divided into cell sectors. For example, the cell associated with base station 114a may be divided into three sectors. Thus, in one embodiment, base station 114a may include three transceivers, i.e., one for each sector of the cell. In another embodiment, base station 114a may employ multiple-input multiple-output (MIMO) technology and, therefore, may utilize multiple transceivers for each sector of the cell.

Base stations 114a, 114b may communicate with one or more of WTRUs 102a, 102b, 102c, 102d over an air interface 116, which may be any suitable wireless communication link (e.g., radio frequency (RF), microwave, infrared (IR), ultraviolet (UV), visible light, etc.). Air interface 116 may be established using any suitable radio access technology (RAT).

More specifically, as noted above, communications system 100 may be a multiple access system and may employ one or more channel access schemes, such as CDMA, TDMA, FDMA, OFDMA, SC-FDMA, or the like. For example, base station 114a in RAN 104 and WTRUs 102a, 102b, 102c may implement a radio technology such as Universal Mobile Telecommunications System (UMTS) Terrestrial Radio Access (UTRA), which may establish air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, base station 114a and WTRUs 102a, 102b, 102c may implement a radio technology such as Evolved UMTS Terrestrial Radio Access (E-UTRA), which may establish air interface 116 using Long Term Evolution (LTE) and/or LTE-Advanced (LTE-A).

In other embodiments, base station 114a and WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), or the like.

Base station 114b in FIG. 1A may be a wireless router, Home Node B, Home eNode B, or access point, for example, and may utilize any suitable RAT for facilitating wireless connectivity in a localized area, such as a place of business, a home, a vehicle, a compass, or the like. In one embodiment, base station 114b and WTRUs 102c, 102d may implement a radio technology such as IEEE 802.11 to establish a wireless local area network (WLAN). In another embodiment, base station 114b and WTRUs 102c, 102d may implement a radio technology such as IEEE 802.15 to establish a wireless personal area network (WPAN). In yet another embodiment, base station 114b and WTRUs 102c, 102d may utilize a cellular-based RAT (e.g., WCDMA, CDMA2000, GSM, LTE, LTE-A, etc.) to establish a picocell or femtocell. As shown in FIG. 1A, base station 114b may have a direct connection to Internet 110. Thus, base station 114b may not be required to access Internet 110 via core network 106.

RAN 104 may be in communication with core network 106, which may be any type of network configured to provide voice, data, applications, and/or voice over internet protocol (VoIP) services to one or more of WTRUs 102a, 102b, 102c, 102d. For example, core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as RAN 104 or a different RAT. For example, in addition to being connected to RAN 104, which may be utilizing an E-UTRA radio technology, core network 106 may also be in communication with another RAN (not shown) employing a GSM radio technology.

Core network 106 may also serve as a gateway for the WTRUs 102a, 102b, 102c, 102d to access PSTN 108, Internet 110, and/or other networks 112. PSTN 108 may include circuit-switched telephone networks that provide plain old telephone service (POTS). Internet 110 may include a global system of interconnected computer networks and devices that use common communication protocols, such as the transmission control protocol (TCP), user datagram protocol (UDP) and the internet protocol (IP) in the TCP/IP internet protocol suite. Other networks 112 may include wired or wireless communications networks owned and/or operated by other service providers. For example, other networks 112 may include another core network connected to one or more RANs, which may employ the same RAT as RAN 104 or a different RAT.

Some or all of WTRUs 102a, 102b, 102c, 102d in communications system 100 may include multi-mode capabilities, i.e., WTRUs 102a, 102b, 102c, 102d may include multiple transceivers for communicating with different wireless networks over different wireless links. For example, WTRU 102c shown in FIG. 1A may be configured to communicate with base station 114a, which may employ a cellular-based radio technology, and with base station 114b, which may employ an IEEE 802 radio technology.

Figure 1B:
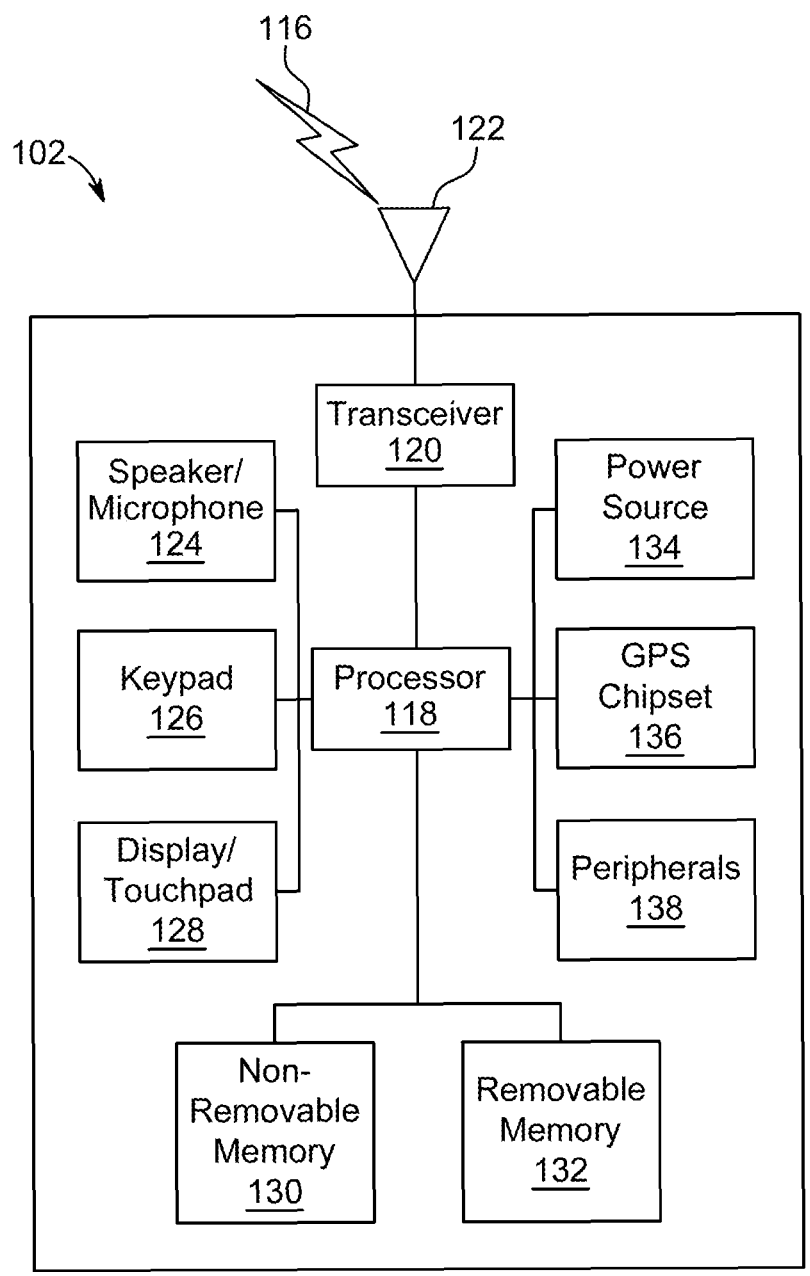
FIG. 1B is a diagram of an example wireless transmit/receive unit (WTRU) that may be used within the communications system illustrated in FIG. 1A.

FIG. 1B is a diagram of an example WTRU 102 that may be used within the communications system illustrated in FIG. 1A. As shown in FIG. 1B, WTRU 102 may include processor 118, transceiver 120, transmit/receive element 122, speaker/microphone 124, keypad 126, display/touchpad 128, non-removable memory 130, removable memory 132, power source 134, global positioning system (GPS) chipset 136, and other peripherals 138. It will be appreciated that WTRU 102 may include any sub-combination of the foregoing elements while remaining consistent with an embodiment.

Processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, or the like. Processor 118 may perform signal coding, data processing, power control, input/output processing, and/or any other functionality that enables WTRU 102 to operate in a wireless environment. Processor 118 may be coupled to transceiver 120, which may be coupled to transmit/receive element 122. While FIG. 1B depicts processor 118 and transceiver 120 as separate components, it will be appreciated that processor 118 and transceiver 120 may be integrated together in an electronic package or chip.

Transmit/receive element 122 may be configured to transmit signals to, or receive signals from, a base station (e.g., base station 114a) over air interface 116. For example, in one embodiment, transmit/receive element 122 may be an antenna configured to transmit and/or receive RF signals. In another embodiment, transmit/receive element 122 may be an emitter/detector configured to transmit and/or receive IR, UV, or visible light signals, for example. In yet another embodiment, transmit/receive element 122 may be configured to transmit and receive both RF and light signals. It will be appreciated that transmit/receive element 122 may be configured to transmit and/or receive any combination of wireless signals.

In addition, although transmit/receive element 122 is depicted in FIG. 1B as a single element, WTRU 102 may include any number of transmit/receive elements 122. More specifically, WTRU 102 may employ MIMO technology. Thus, in one embodiment, WTRU 102 may include two or more transmit/receive elements 122 (e.g., multiple antennas) for transmitting and receiving wireless signals over air interface 116.

Transceiver 120 may be configured to modulate the signals that are to be transmitted by transmit/receive element 122 and to demodulate the signals that are received by transmit/receive element 122. As noted above, WTRU 102 may have multi-mode capabilities. Thus, transceiver 120 may include multiple transceivers for enabling WTRU 102 to communicate via multiple RATs, such as UTRA and IEEE 802.11, for example.

Processor 118 of WTRU 102 may be coupled to, and may receive input data from, speaker/microphone 124, keypad 126, and/or display/touchpad 128 (e.g., a liquid crystal display (LCD) display unit or organic light-emitting diode (OLED) display unit). Processor 118 may also output user data to speaker/microphone 124, keypad 126, and/or display/touchpad 128. In addition, processor 118 may access information from, and store data in, any type of suitable memory, such as non-removable memory 130 and/or removable memory 132. Non-removable memory 130 may include random-access memory (RAM), read-only memory (ROM), a hard disk, or any other type of memory storage device. Removable memory 132 may include a subscriber identity module (SIM) card, a memory stick, a secure digital (SD) memory card, or the like. In other embodiments, processor 118 may access information from, and store data in, memory that is not physically located on WTRU 102, such as on a server or a home computer (not shown).

Processor 118 may receive power from power source 134, and may be configured to distribute and/or control the power to the other components in WTRU 102. Power source 134 may be any suitable device for powering WTRU 102. For example, power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, or the like.

Processor 118 may also be coupled to GPS chipset 136, which may be configured to provide location information (e.g., longitude and latitude) regarding the current location of WTRU 102. In addition to, or in lieu of, the information from GPS chipset 136, WTRU 102 may receive location information over air interface 116 from a base station (e.g., base stations 114a, 114b) and/or determine its location based on the timing of the signals being received from two or more nearby base stations. It will be appreciated that WTRU 102 may acquire location information by way of any suitable location-determination method while remaining consistent with an embodiment.

Processor 118 may further be coupled to other peripherals 138, which may include one or more software and/or hardware modules that provide additional features, functionality and/or wired or wireless connectivity. For example, peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, or the like.

Figure 1C:
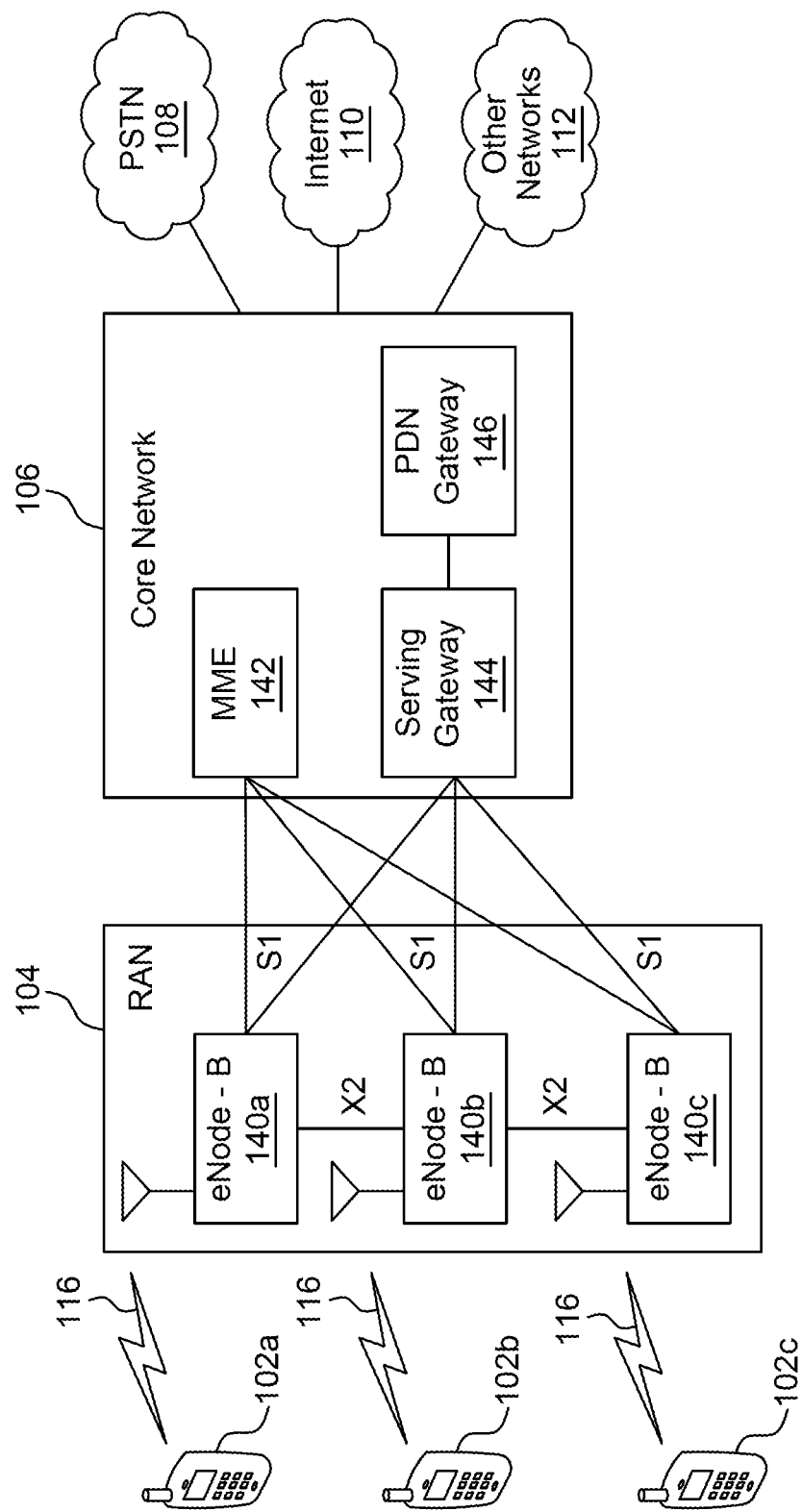
FIG. 1C is a diagram of an example radio access network and an example core network that may be used within the communications system illustrated in FIG. 1A.

FIG. 1C is a diagram of an example RAN 104 and an example core network 106 that may be used within the communications system illustrated in FIG. 1A. As noted above, RAN 104 may employ an E-UTRA radio technology to communicate with WTRUs 102a, 102b, 102c over air interface 116. RAN 104 may also be in communication with core network 106.

RAN 104 may include eNode-Bs 140a, 140b, 140c, though it will be appreciated that the RAN 104 may include any number of eNode-Bs while remaining consistent with an embodiment. eNode-Bs 140a, 140b, 140c may each include one or more transceivers for communicating with WTRUs 102a, 102b, 102c over air interface 116. In one embodiment, eNode-Bs 140a, 140b, 140c may implement MIMO technology. Thus, eNode-B 140a, for example, may use multiple antennas to transmit wireless signals to, and receive wireless signals from, the WTRU 102a.

Each of eNode-Bs 140a, 140b, 140c may be associated with a particular cell (not shown) and may be configured to handle radio resource management decisions, handover decisions, scheduling of users in the uplink and/or downlink, or the like. As shown in FIG. 1C, eNode-Bs 140a, 140b, 140c may communicate with one another over an X2 interface.

Core network 106 shown in FIG. 1C may include mobility management entity (MME) gateway 142, serving gateway 144, and packet data network (PDN) gateway 146. While each of the foregoing elements are depicted as part of core network 106, it will be appreciated that any one of these elements may be owned and/or operated by an entity other than the core network operator.

MME gateway 142 may be connected to each of eNode-Bs 140a, 140b, 140c in RAN 104 via an S1 interface and may serve as a control node. For example, MME gateway 142 may be responsible for authenticating users of WTRUs 102a, 102b, 102c, bearer activation/deactivation, selecting a particular serving gateway during an initial attach of WTRUs 102a, 102b, 102c, or the like. MME gateway 142 may also provide a control plane function for switching between RAN 104 and other RANs (not shown) that employ other radio technologies, such as GSM or WCDMA.

Serving gateway 144 may be connected to each of eNode Bs 140a, 140b, 140c in RAN 104 via the S1 interface. Serving gateway 144 may generally route and forward user data packets to/from WTRUs 102a, 102b, 102c. Serving gateway 144 may also perform other functions, such as anchoring user planes during inter-eNode B handovers, triggering paging when downlink data is available for WTRUs 102a, 102b, 102c, managing and storing contexts of WTRUs 102a, 102b, 102c, or the like.

Serving gateway 144 may also be connected to PDN gateway 146, which may provide WTRUs 102a, 102b, 102c with access to packet-switched networks, such as Internet 110, to facilitate communications between WTRUs 102a, 102b, 102c and IP-enabled devices.

Core network 106 may facilitate communications with other networks. For example, core network 106 may provide WTRUs 102a, 102b, 102c with access to circuit-switched networks, such as PSTN 108, to facilitate communications between WTRUs 102a, 102b, 102c and traditional land-line communications devices. For example, core network 106 may include, or may communicate with, an IP gateway (e.g., an IP multimedia subsystem (IMS) server) that serves as an interface between core network 106 and PSTN 108. In addition, core network 106 may provide the WTRUs 102a, 102b, 102c with access to other networks 112, which may include other wired or wireless networks that are owned and/or operated by other service providers.

Other networks 112 may further be connected to an IEEE 802.11 based wireless local area network (WLAN) (not shown). A WLAN may include an access router. The access router may contain gateway functionality. The access router may be in communication with a plurality of access points (APs). The communication between an access router and APs may be via wired Ethernet (IEEE 802.3 standards), or any type of wireless communication protocol. An AP may be in wireless communication over an air interface with any WTRU.

Zero tail discrete Fourier transform spread orthogonal frequency division multiplexing (ZT-DFT-S-OFDM) or Unique-word (UW)-OFDM are waveforms that utilize ZT or UW instead of cyclic prefixes while maintaining the benefits of the cyclic prefix (CP) structure. When using ZT or UW, a subset of available dimensions may be used for suppression while the rest may be a fixed sequence. The examples given herewith may be utilized in any wireless systems including Wi-Fi, high frequency air interfaces (e.g. 60 GHz,), fifth generation (5G) wireless systems, 802.11xx, 802.11ad, 802.11ay, or the like.

Figure 2:
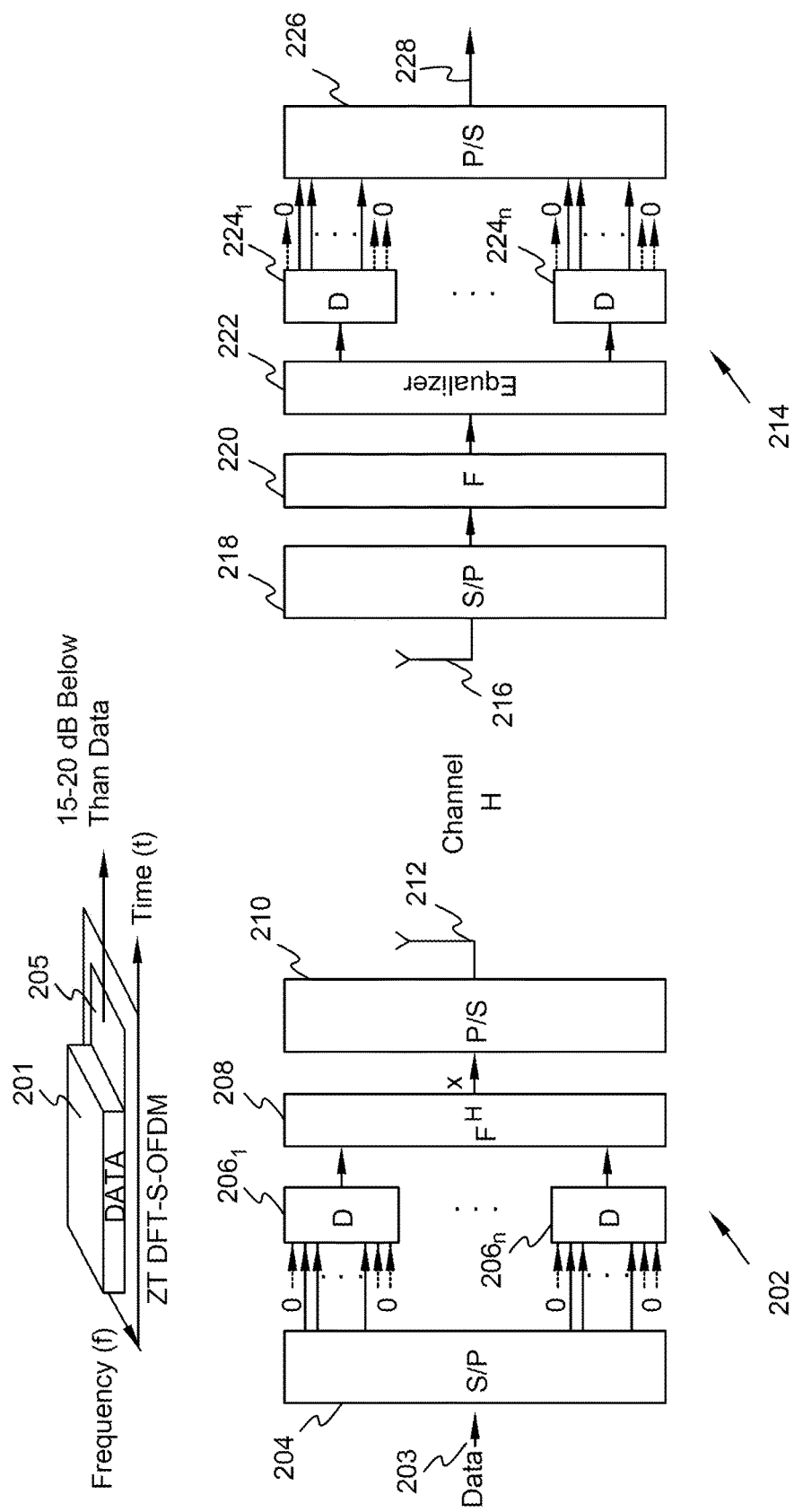
FIG. 2 is an illustration of zero tail discrete Fourier transform spread orthogonal frequency division multiplexing (ZT-DFT-S-OFDM) transmitter and receiver.

FIG. 2 is an illustration of a ZT-DFT-S-OFDM transmitter 202 and receiver 214. Data 203 may be inputted to serial-to-parallel (S/P) function 204 to generate a parallel information stream that is spread and modulated with a zero tail(s) by DFT spreading functions $206_1$ to $206_n$. The output signal(s) of DFT spreading functions $206_1$ to $206_n$ may subsequently be converted to the time domain by inverse DFT function 208 producing output signal x. Output signal x may subsequently be inputted to parallel-to-serial (P/S) function 210 and transmitted by antenna 212.

Transmissions by transmitter 202 may go over channel H to receiver 214 and received by antenna 216. Signals received by receiver 214 may be processed by S/P function 218 to generate a parallel information stream that is converted to the frequency domain by DFT function 220 to be equalized in the frequency domain by frequency domain equalizer (FDE) function 222. The output signal(s) of FDE function 222 may be despread by DFT despreading functions $224_1$ to $224_n$, and the data parts converted to serial stream 228 by P/S function 226.

For ZT-DFT-S-OFDM transmissions by transmitter 202, DFT-S-OFDM symbols may be generated where power in the time domain in tail 205 may be made substantially less than data symbol 201. As an example, the tail may be 15-20 dB below any data portion power level. If DFT-S-OFDM symbols preceding data symbol 201 follow a similar relationship, tail 205 may maintain a circular convolution of the channel for a transmission and reception. Circular convolution may allow frequency domain equalization at receiver 214 maintaining a desirable feature of CPs with the improved energy management of ZT. Although a tail is used for data symbol 201, a zero head may similarly be utilized providing similar properties as a tail. Thus, for any of the examples given herewith, a zero head may be substituted for a zero tail.

Figure 3:
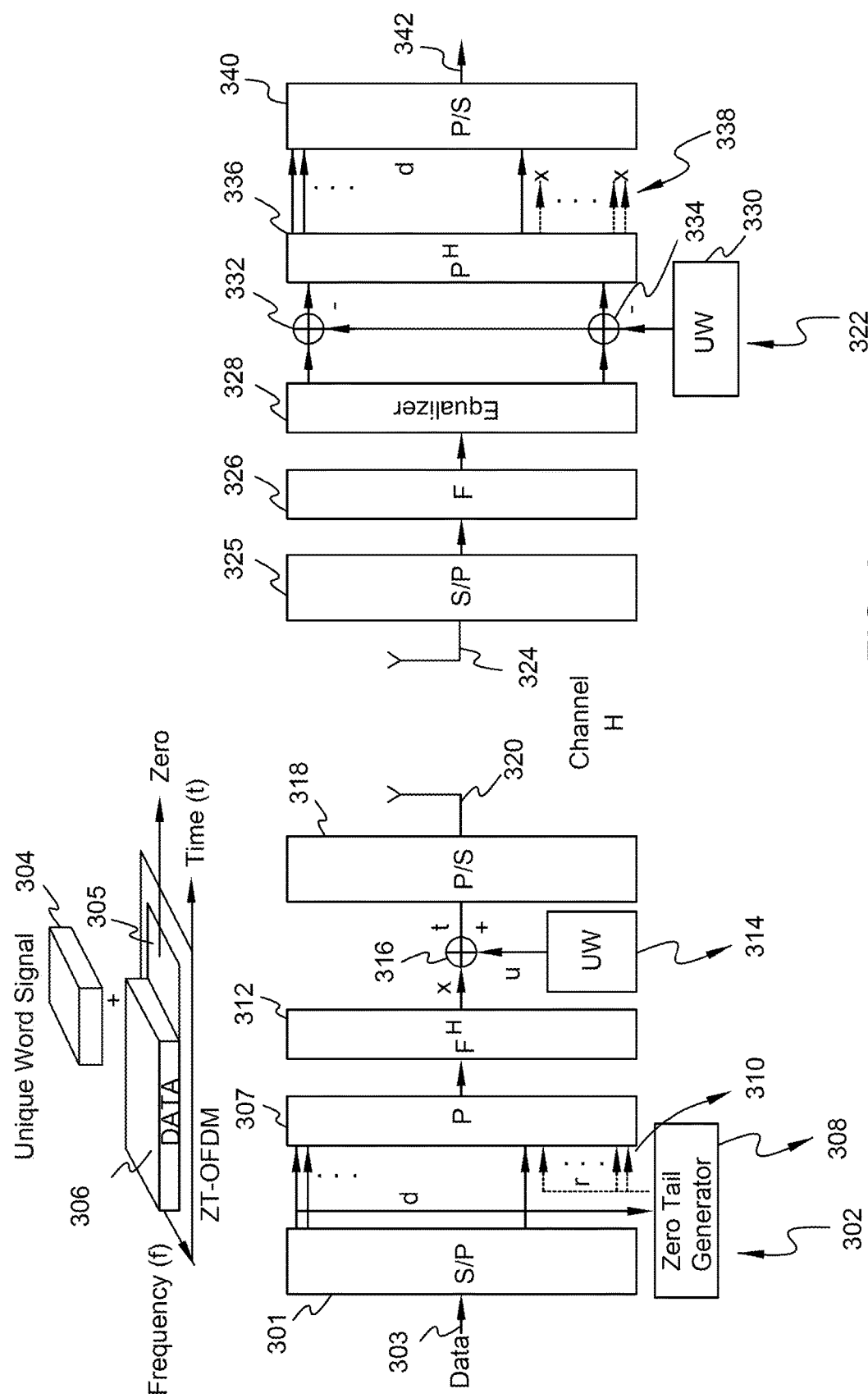
FIG. 3 is an illustration of a unique word OFDM (UW-OFDM) transmitter and receiver.

FIG. 3 is an illustration of a UW-OFDM transmitter 302 and receiver 322. A UW may be a fixed sequence located at the tail of each symbol that may result in a channel being converted from a linear convolution to a circular convolution. Circular convolution properties of a waveform may allow simpler equalization or demodulation at receiver 322. Unlike CPs, a UW may not be data dependent. Unlike CPs or ZT, UW may allow use of a substantial amount of symbol energy at receiver 322 and have lower dynamic range properties. Also, utilization of UW may lower physical layer processing latency for a communication, be utilized for synchronization at receiver 322, or be utilized for phase tracking at receiver 322.

In comparison to tail 205 being substantially less (e.g., 15-20 dB below any data portion) than data symbol 201, UW-OFDM may provide substantially exact zero samples at tail 305 of OFDM symbol 306 by adding extra fixed samples to the tail as UW signal 304 at transmitter 302. UW signal 304 may also result in a channel being converted from a substantially linear convolution to a substantially circular convolution waveform to allow frequency domain equalization at receiver 322 and to allow training at receiver 322 to adjust for any phase drifts, multi-path fading, fading, Rayleigh fading, or the like.

The use of UW signal 304 may result in a substantially constant tail 305 for OFDM symbol 306. UW signal 304 may also provide substantially exact zero samples of tail 305 to OFDM symbol 306 by using a set of redundant subcarriers. The set of redundant subcarriers are modulated with values of vector(s) r 310 generated by zero tail generator function 308.

Vector(s) r 310 may be generated from data vector(s) d that is formed by S/P function 301 from data 303. Transmitter 302 may use permutation matrix P function 307 to map values of vector(s) r 310 to redundant subcarriers. The output of permutation matrix P function 307 is provided to inverse DFT function 312 to generate vector x. A fixed UW vector u is generated by UW function 314 and added by addition function 316 to vector x to the tail 305 of OFDM symbol 306 to produce signal t. Signal t is parallel-to-serial converted by P/S function 318 to be subsequently transmitted using antenna 320.

Transmissions by transmitter 302 may go over channel H to receiver 322 and received by antenna 324. Signals received by receiver 322 may be processed by S/P function 325 to generate a parallel information stream that is converted to the frequency domain by DFT function 326 and equalized in the frequency domain by FDE function 328. UW signal 304 is outputted by UW function 330 and subtracted from the output signal(s) of FDE function 328 by subtraction functions 332 and 334. Inverse permutation matrix function 336 takes the outputs of subtraction functions 332 and 334 to recover data vector(s) d and signals x 338. Data vector(s) d are converted to a serial stream 342 by P/S function 340.

In certain configurations, the norm of vector(s) r 310 may be significantly large causing high power consumption at transmitter 302 and distortion from quantization errors in signals received by antenna 324. The location of redundant subcarriers may be adapted or optimized by permutation matrix P function 307 to reduce the impact of high power consumption or distortion. Optimization of P may be performed by using a non-deterministic polynomial-time hard (NP-hard) function and an exhaustive search of all possible solutions. Optimization may also be performed by heuristic algorithms for P. Zero tail generator function 308 may also utilize a predetermined number or most of the subcarriers of data symbol 306 to generate a zero tail for vector x.

Figure 4:
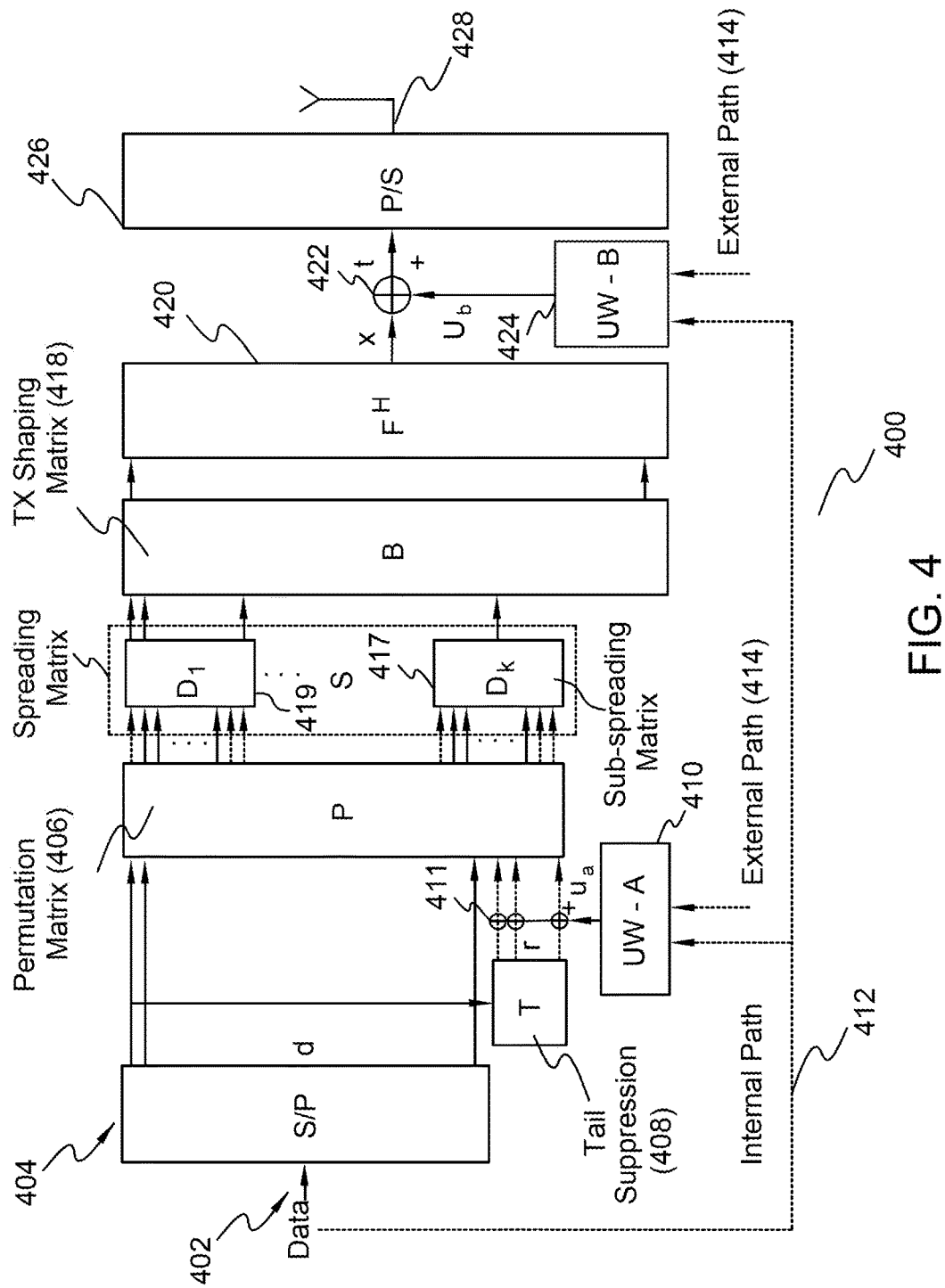
FIG. 4 is an illustration of a DFT-S-OFDM transmitter with tail suppression.

FIG. 4 is an illustration of a DFT-S-OFDM transmitter 400 with tail suppression. Although transmitter 400 gives a configuration for tail suppression for DFT-S-OFDM information, the configuration of transmitter 400 may be equivalently or substantially equivalently applied to any DFT-S symbols, data, information, control information, or the like. In addition, although tail suppression for a symbol is provided by transmitter 400, a zero head may similarly be generated by transmitter 400 or any of other transmitter architectures/examples given herewith.

Transmitter 400 may generate suppressed DFT-S-OFDM symbols at a tail(s) of one or more DFT-S-OFDM symbol(s). Tail suppression utilized by transmitter 400 may include using a UW at a tail(s) of one or more DFT-S-OFDM symbol(s) or creating distortion at the output of UW-A 410 function or component to result in zero tail(s) for symbol(s) while using less energy, low PAPR, low out-of-band (OOB), etc.

Transmitter 400 may generate a signal(s) or a waveform(s) that utilizes a decaying region(s) of pulse shapes in the time domain while consuming substantially low power or energy to suppress the tail(s) of one or more DFT-S-OFDM symbol(s). Operation of transmitter 400 may also avoid substantially large values at the output of tail suppression 408 function or component so that a high peak-to-average power ratio (PAPR) may be avoided in a waveform or signal.

In the examples given herewith, for single user transmissions over a multipath channel modulated symbols may be represented as vector(s) $d \in \mathbb{C}^{N_d \times 1}$, where $N_d$ is the number of modulation symbols. Vector(s) d, the output of S/P 404 function or component, may be processed by tail suppression 408 function or component as $$r = Td, \quad \text{Equation (1)}$$

where $r \in \mathbb{C}^{N_r \times 1}$ may be the suppressing vector(s) that cancels impact of symbol vector(s) d at the tail of an OFDM symbol, $T \in \mathbb{C}^{N_r \times N_d}$ is a precoding matrix that may generate suppressing vector(s) r, and $N_r$ is the available dimension for tail suppression 408 function or component. The composition of precoding matrix T may depend on how symbols are processed at transmitter 400. Vector $u_a \in \mathbb{C}^{N_r \times 1}$ generated by UW-A 410 function or component may be added to vector(s) r at addition function(s) 411 in order generate a UW substantially prior to spreading. Vector $u_a$ may be generated and utilized to provide a simpler or less complex receiver structure at receiver 500. In addition, vector $u_a$ may be generated such that it maintains orthogonality of subcarriers or subchannels between symbols of signal vector x.

In transmitter 400, operation of DFT sub-spreading matrices $D_1$ to $D_k$ may be expressed by $D_k \in \mathbb{C}^{M_k \times M_k}$, where $M_k$ is the size of the kth DFT matrix. DFT sub-spreading matrices $D_1$ to $D_k$ may modulate data symbols using values generated by tail suppression 408 function or component. In addition, user diversity or frequency selective link adaptation 526 from receiver 500 may be utilized by DFT sub-spreading matrices $D_1$ to $D_k$ to adapt spreading for channel variations, fading, or the like. Link adaptation 526 may especially be utilized when vector $u_a$ is known by receiver 500.

Parallel K DFT sub-spreading matrices may be utilized and stacked to generate a spreading matrix such as $S \in \mathbb{C}^{L \times L}$, where $L = \sum_{k=1}^{K} M_k = N_d + N_r$. Permutation matrix P 406 function or component may be utilized to map modulation symbols and elements of suppressing vector(s) r to input(s) of the DFT sub-spreading matrices $D_1$ to $D_k$. When it is desirable to utilize the decaying region of pulse shapes in the time domain, permutation matrix P 406 function or component may not map a modulation symbol to the tails of a DFT-S-OFDM symbol. Lower end DFT sub-spreading matrices 417 may be configured to generate $M_{k,tail}$ that may be reserved for symbols generated by tail suppression 408 function or component to generate a substantially small value for elements of suppressing vector(s) r. Correspondingly, upper end DFT sub-spreading matrices 419 functions or components may generate $M_{k,header}$ for tail suppression 408 function or component that may lower OOB leakage. Permutation matrix P 406 function or component may be configured for interleaved or localized mappings of modulation symbols.

Output(s) of DFT sub-spreading matrices $D_1$ to $D_k$ may be replicated and shaped in the frequency domain by transmit (TX) shaping matrix 418 function or component to construct a matrix B for different pulse shapes. Matrix $B \in \mathbb{C}^{N \times KM}$ may map output(s) of DFT sub-spreading matrices $D_1$ to $D_k$ such that the result is a sinc function in the time domain. The result may be a sinc function due to the output of DFT sub-spreading matrices $D_1$ to $D_k$ being mapped to certain subcarriers, which correspond to a rectangular shape in the frequency domain. Processed samples in frequency from outputs of DFT sub-spreading matrices $D_1$ to $D_k$ may be converted to the time domain by inverse DFT 420 function or component that utilizes matrix $F \in \mathbb{C}^{N \times N}$. In the time domain, signal or output x may be expressed as $$x = F^H BSP \begin{bmatrix} d \\ Td + u_a \end{bmatrix}, \quad \text{Equation (2)}$$

where $x \in \mathbb{C}^{N \times 1}$ is the signal vector in the time domain and $(\cdot)^H$ corresponds to the Hermitian operation.

Precoding matrix T may be based on matrix A. Matrix A may be determined by $F^H BSP$ which describes how symbol vector(s) d and suppressing vector(s) r are processed by transmitter 400. Matrix A may be grouped into four submatrices as $$A = F^H BSP = \begin{bmatrix} M_{11} & M_{12} \\ M_{21} & M_{22} \end{bmatrix},$$ Equation (3)

where $M_{21} \in \mathbb{C}^{N_{tail} \times N_d}$, $M_{22} \in \mathbb{C}^{N_{tail} \times N_r}$ and $N_{tail}$ correspond to the number of samples at the tail. The main part and the tail part may then be obtained as $$x = \begin{bmatrix} x_{main} \\ x_{tail} \end{bmatrix} = \begin{bmatrix} M_{11} & M_{12} \\ M_{21} & M_{22} \end{bmatrix} \begin{bmatrix} d \\ Td + u_a \end{bmatrix}.$$ Equation (4)

Hence, $$x_{tail} = M_{21}d + M_{22}\underbrace{Td}_{r} + M_{22}u_a.$$ Equation (5)

In order to suppress the impact of the data symbol in the tail of a DFT-S-OFDM symbol, it may be desirable for the output tail suppressing function r to substantially cancel $M_{21}d$. Cancellation may include minimizing the energy of $M_{21}d + M_{22}r$ as follows:

$$r = \mathrm{argmin}_r \|M_{21}d + M_{22}r\|_2.$$ Equation (6)

If $M_{21}d$ is in the range of the columns of $M_{22}$, Equation (6) may be a minimum norm problem. If $M_{21}d$ is not in the range of the columns of $M_{22}$, Equation (6) may be a least square-error problem. For either case, a solution may be obtained by the pseudoinverse of $M_{22}$ as $$\underbrace{r}_{T} = -M_{22}^\dagger M_{21}\, d$$ Equation (7)

where $(\cdot)^\dagger$ is the pseudoinverse operation. If the dimension of vector(s) r, i.e., $N_r$, is greater than or equal to the dimension of the tail $N_{tail}$, tail suppression 408 function or component may achieve a substantially perfect zero tail for signal vector x. A substantially perfect zero tail may be achieved by a minimum norm problem or the like, as desired. If $N_r$ is less than the dimension of the tail $N_{tail}$, tail suppression 408 function or component may achieve a minimum suppressed tail based on the least squares method (minimum norm, least square-error problem).

Once signal vector x is generated, unique word signal UW-B may be provided by UW-B 424 function or component and appended to signal vector x at addition function 422. $u_b \in \mathbb{C}^{N \times 1}$ may be the UW-B vector where the last $N_{tail}$ elements contain the UW signal. Transmitted signal may be expressed as $$t = F^H BSP \begin{bmatrix} d \\ Td + u_a \end{bmatrix} + u_b,$$ Equation (8)

where $t \in \mathbb{C}^{N \times 1}$ is the transmitted signal vector to be transmitted using antenna 428 after parallel-to-serial conversion by P/S 426 function or component.

Figure 5:
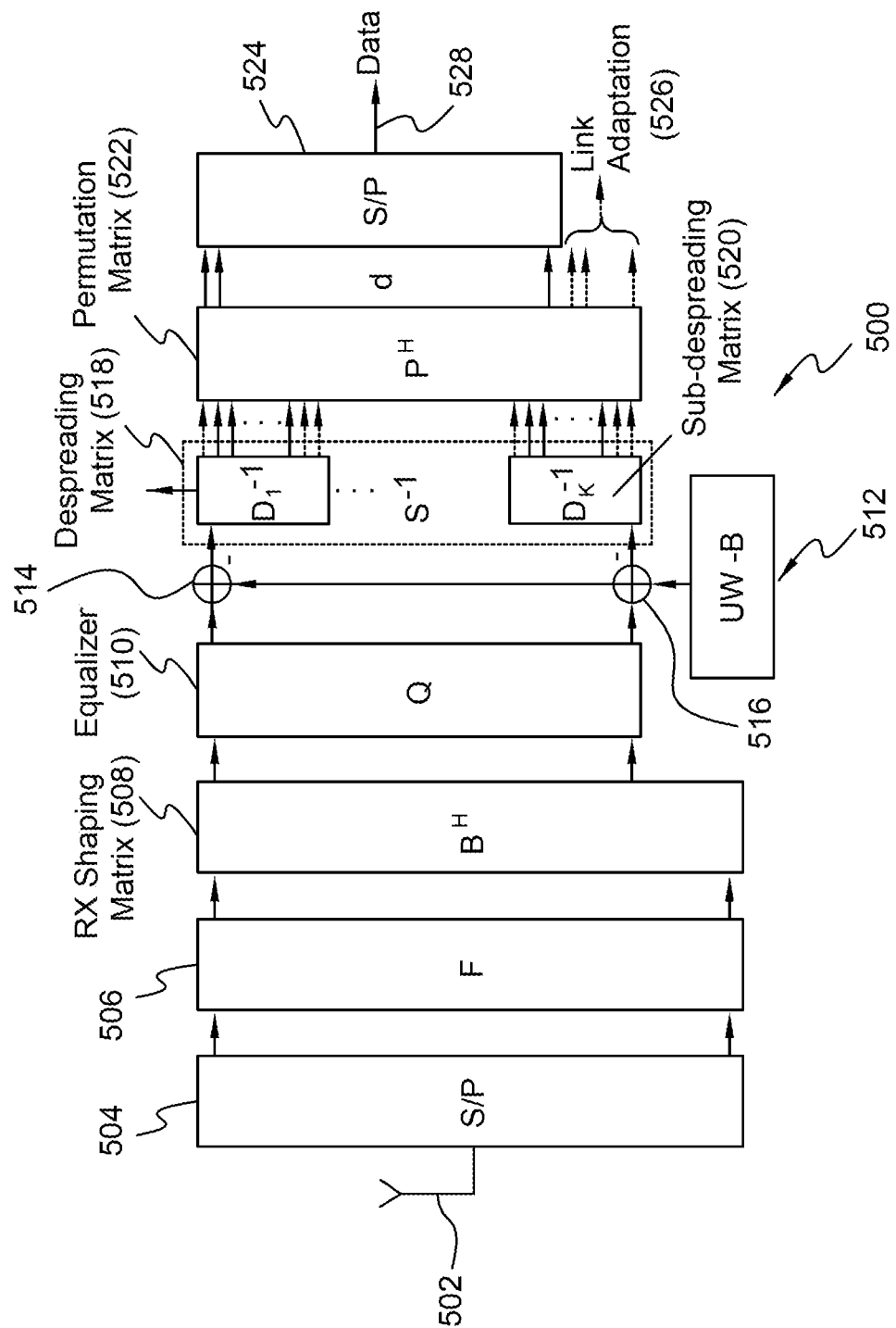
FIG. 5 is an illustration of a UW-DFT-S-OFDM receiver.

FIG. 5 is an illustration of a UW-DFT-S-OFDM receiver 500. Receiver 500 may perform substantially the reverse operations of transmitter 400 while considering the impact of a communication channel. Antenna 502 receives transmissions by transmitter 400. Received signals are serial-to-parallel converted by S/P function 504 and processed by DFT F 506. The output(s) of DFT F 506 may be provided to receiver shaping matrix $B^H$ 508. When transmitted signal vector t passes through a multipath channel, any leakage between symbols may be reduced by frequency domain equalization by FDE 510. At least part of the receiving operation by receiver 500 may be expressed as $$d = P^H S^{-1}(QB^{-1}Fx - Fu_b),$$ Equation (9)

where Q is the equalization operation performed by FDE 510 such as by utilization of any one of a minimum mean square error (MMSE), zero forcing, best linear minimum unbiased estimators (BLUE), or the like function. The inverse operation may also be substituted with a Hermitian operation depending on spreading and pulse shaping (e.g., Nyquist or non-Nyquist). Subsequent to the equalization operation, any appended UW-B signals may be removed at subtraction functions 514 and 516 by calculating a channel response in the frequency domain by UW-B function 512. Despreading matrix 518 may be comprised of sub-despreading matrices $D_1^{-1}$ to $D_K^{-1}$ 520 that compose matrix S to despread the output of subtraction functions 514 and 516 and communicate results to inverse or receiver permutation matrix 522 using matrix P in order to recover data vector(s) d. Data vector(s) d may be serial-to-parallel converted by S/P function 524 to produce data 528.

DFT-S-OFDM symbols may be defined in time and frequency. As an example, a single DFT sub-spreading function may be considered with its output being mapped to matrix $F^H$ in a localized manner. An output of $F^H$ may be a modulated signal which is generated with a circular convolution of the interpolated data symbols with a sinc function. An oversampling ratio for lower end DFT sub-spreading matrices 417 may be expressed as $N/M_k$. With this configuration, a main lobe of the sinc function may not appear in the tail in order to minimize the energy in the tail part of DFT-S-OFDM. Thus, the lower-end DFT sub-spreading matrices 417 may not be used for the data symbols and the condition given by $$\frac{M_{tail,k}}{M_k} \geq \frac{N_{tail}}{N}$$ Equation (10)

may hold true. The condition in Equation (10) may also be applicable for ZT-DFT-S-OFDM for zero samples.

As an example, if there are 512 subcarriers and last the 64 samples are considered for the tail, at least 8 samples may not be used when $M_k = 64$. In addition, the condition given by $N_r \geq N_{tail}$ may be satisfied in order to achieve a substantially perfect zero sequence at a tail. Otherwise, the tail may not be completely canceled but suppressed depending on the available degrees-of-freedom (DoF), i.e., $N_r$. To mitigate any OOB leakage, the first symbols in time, or upper end DFT sub-spreading matrices 419 functions or components, may be reserved with the following condition maintained $$M_{header,k} \geq 1.$$ Equation (11)

In the examples given herewith, at least two UW vectors $u_a$ and $u_b$ may be utilized. UW vector $u_a$ may be a UW expressed by $M_{22}u_a$ and generated by UW-A 410 function or component. For certain configurations, if $M_{22}$ is not a complete matrix, i.e., $N_{tail} > N_r$, it may not be possible for UW-A 410 function or component to generate substantially or mostly every possible UW in the time domain at the output of transmitter 400. For transmission by transmitter 400, receiver 500 may recover data 402 without knowledge of $u_a$ a priori in order to cancel the impact of the UW since the UW-A signal is discarded at the output of an inverse or receiver permutation matrix. Moreover, if $N_{tail} \leq N_r$, any UW signal (which also corresponds to the tail part of the UW-B) may be generated by using an UW-A signal since the columns of $M_{22}$ may span a whole solution space. Vector $u_b$ may be any sequence especially in configurations where it is signaled to or known by receiver 500. For instance, vector $u_b$ may be longer than $N_{tail}$. In certain configurations, vector $u_b$ may be canceled at receiver 500 after equalization by equalizer 510.

Again referring to FIG. 4, UW vectors $u_a$ and $u_b$ may be generated adaptively based on data 402 by using internal path 412 provided or feedback to UW-A 410 function or component or UW-B 424 function or component. UW vector $u_b$ may also be based on a predetermined table known or exchanged between transmitter 400 and receiver 500, upper layer signaling, higher layer signaling, a decision function in upper layers, or the like. UW-B 424 function or component may also be generated using external data or feedback provided by external path 414. UW vectors $u_a$ and $u_b$ may also be fixed to generate a certain or desired sequence. For instance UW vectors $u_a$ and $u_b$ may be a Golay sequence as in IEEE 802.11ad or the like. Various UWs for different users/streams including multiple antennas or MIMO configurations may also be used to distinguish users by transmitter 400.

Figure 6A:
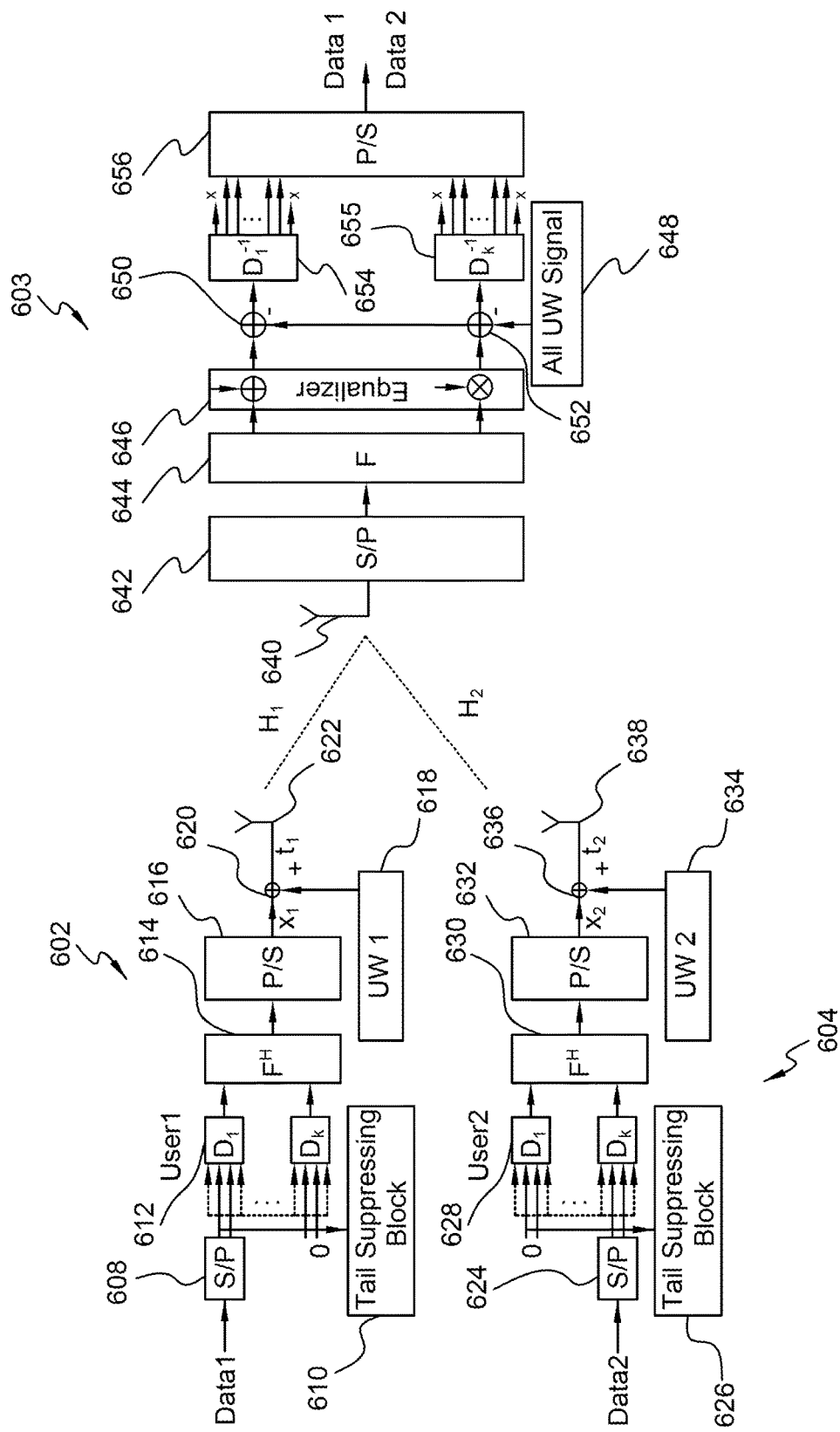
FIG. 6A is an illustration of transmitters using tail suppression in a multi-user interference environment.

Moreover, data 402 may be composed of data from different component carriers, different cells, multiple cells, or the like for a given user device. Such a configuration may be utilized when transmitter 400 or receiver 500 operate in an LTE-A mode or network. For this configuration, tail suppression 408 function or component, UW-A 410 function or component, UW-B 424 function or component, TX shaping matrix 418 function or component, or receiver shaping matrix $B^H$ 508 may be adapted or adjusted on a component carrier or cell basis for each user device. In addition, tail suppression 408 function or component, UW-A 410 function or component, UW-B 424 function or component, permutation matrix 406 function or component, TX shaping matrix 418 function or component, or receiver shaping matrix $B^H$ 508 may be adapted or vary based on the one or more radio access technologies (RATs) utilized by transmitter 400 or receiver 500 in a given time period, transmission time interval (TTI), or the like. Adaptation for multiple carriers, component carriers, RATs, etc. may similarly apply to transmissions by any one of transmitters 602, 604, 660, 677, 702, 704, or 802 or reception by any one receivers 500, 603, 680, or 767 in any of the examples given herewith FIG. 6A is an illustration of transmitters 602 and 604 using tail suppression in a multi-user interference environment. For transmissions utilizing UW-B, transmitters 602 and 604 may use the same UW-B at different DFT sub-spreading functions 612 and 628, respectively. In this configuration, tail suppression functions 610 and 626 may utilize a larger dimension to suppress tails. However, since user 1 and 2 devices perform a substantially same operation at DFT sub-spreading functions 612 and 628, multi-user interference may be observed by receiver 603.

In transmitter 602, output(s) of tail suppressing function 610 may be generated based on the output(s) of S/P function 608 generated from data 1. DFT sub-spreading function 612 may comprise DFT sub-spreading matrices $D_1$ to $D_k$ that generate modulated symbols using output(s) of tail suppressing function 610, zero inputs at certain subcarriers, and outputs of S/P function 608. The zero inputs of sub-spreading matrix $D_k$ may allow multiple access and usage of the zeroed subcarrier(s) by other users by not transmitting data on those subcarrier(s) by user 1 device. The outputs of DFT sub-spreading matrices $D_1$ to $D_k$ may be provided to inverse DFT function 614 to be parallel-to-serial converted by function P/S 616 to generate vector $x_1$. UW 1 618 may be added to vector $x_1$ to produce signal $t_1$ at addition function 620. Signal $t_1$ may be subsequently transmitted using antenna 622.

In transmitter 604, output(s) of tail suppressing function 626 may be generated based on the output(s) of S/P function 624 generated from data 2. DFT sub-spreading function 628 may comprise DFT sub-spreading matrices $D_1$ to $D_k$ that generate modulated symbols using output(s) of tail suppressing function 626, zero inputs at certain subcarriers, and outputs of S/P function 624. The zero inputs of sub-spreading matrix $D_1$ may allow multiple access and usage of the zeroed subcarrier(s) by other users by not transmitting data on those subcarrier(s) by user 2 device. The outputs of DFT sub-spreading matrices $D_1$ to $D_k$ may be provided to inverse DFT function 630 to be parallel-to-serial converted by function P/S 632 to generate vector $x_2$. UW 2 may be added to vector $x_2$ to produce signal $t_2$ at addition function 636. Signal $t_2$ may be subsequently transmitted using antenna 638.

At receiver 603, data 1 and data 2 are recovered by performing substantially the reverse operation of transmitters 602 and 604. $H_1$ may represent the channel response for transmissions from transmitter 602. $H_2$ may represent the channel response for transmissions from transmitter 604. Transmissions to receiver 603 may be received by antenna 640 and serial-to-parallel converted by S/P function 642 to provide an information stream to DFT F 644. The output(s) of DFT F 644 are equalized in the frequency domain by FDE function 646. All UW function 648 outputs UW 1 618 and UW 2 634 to be removed from the equalized output(s) of FDE function 646 at subtraction functions 650 and 652. Despreading matrix 654 and 655 may despread the output of subtraction functions 650 and 652 and communicate despread data portions to P/S function 656 to produce data 1 and data 2.

Figure 6B:
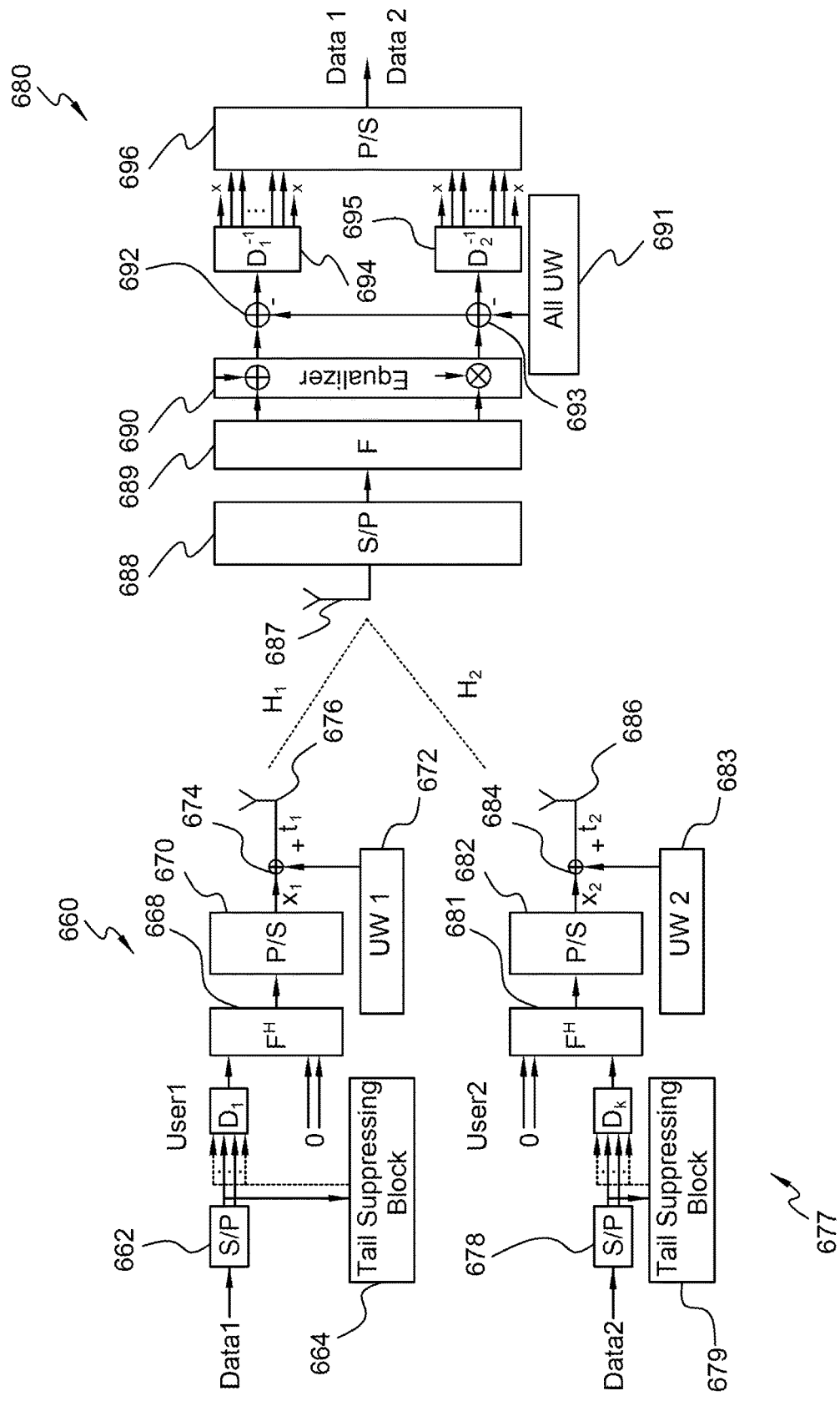
FIG. 6B is an illustration of transmitters using tail suppression substantially without multi-user interference.

FIG. 6B is an illustration of transmitters 660 and 677 using tail suppression substantially without multi-user interference. For transmitter 660, tail suppressing function 664 may be utilized only by DFT sub-spreading matrix $D_1$ of user 1 device. For transmitter 677, tail suppressing function 679 may be utilized only by DFT sub-spreading matric $D_k$ of user 2 device. This configuration of transmitters 660 and 677 may lead to lower degrees-of-freedom for tail suppressing functions 664 and 679 but multi-user interference may be avoided. For uplink transmissions, transmitter(s) 660 or 677 may utilize UW-B signals that require removal after the equalization operation at receiver 680. When UW-A is also utilized by transmitter(s) 660 or 677, UW-A signals of user 1 and 2 devices may not need removal at receiver 680 subsequent to removal of UW-B.

In transmitter 660, output(s) of tail suppressing function 664 may be generated based on the output(s) of S/P function 662 generated from data 1. DFT sub-spreading matrix $D_1$ may generate modulated symbols using output(s) of tail suppressing function 664 and output(s) of S/P function 662. The output of DFT sub-spreading matrix $D_1$ may be provided to inverse DFT function 668 with zero inputs for conversion. The zero inputs may allow multiple access and usage of the zeroed subcarrier(s) by other users by not transmitting data on those subcarrier(s) by user 1 device. The output of inverse DFT function 668 may be parallel-to-serial converted by function P/S 670 to generate vector $x_1$. UW 1 672 may be added to vector $x_1$ to produce signal $t_1$ at addition function 674. Signal $t_1$ may be subsequently transmitted using antenna 676.

In transmitter 677, output(s) of tail suppressing function 679 may be generated based on the output(s) of S/P function 678 generated from data 2. DFT sub-spreading function $D_k$ may generate modulated symbols using output(s) of tail suppressing function 679 and output(s) of S/P function 678. The output of DFT sub-spreading matrices $D_k$ may be provided to inverse DFT function 681 with zero inputs for conversion. The zero inputs may allow multiple access and usage of the zeroed subcarrier(s) by other users by not transmitting data on those subcarrier(s) by user 2. The output of inverse DFT function 681 may be parallel-to-serial converted by function P/S 682 to generate vector $x_2$. UW 2 may be added to vector $x_2$ to produce signal $t_2$ at addition function 684. Signal $t_2$ may be subsequently transmitted using antenna 686.

At receiver 680, data 1 and data 2 are recovered by performing a substantially reverse operation of transmitters 660 and 677. $H_1$ may represent the channel response for transmissions from transmitter 660. $H_2$ may represent the channel response for transmissions from transmitter 677. Transmissions to receiver 680 are received by antenna 687 and serial-to-parallel converted by S/P function 688 to provide an information stream to DFT F 689. The output(s) of DFT F 689 are equalized in the frequency domain by FDE function 690. All UW function 691 outputs UW 1 672 and UW 2 683 to be removed from the equalized output(s) of FDE function 690 at subtraction functions 692 and 693. Despreading matrix 694 and 695 may despread the output of subtraction functions 692 and 693 and communicate despread data portions to P/S function 696 to produce data 1 and data 2.

Figure 7A:
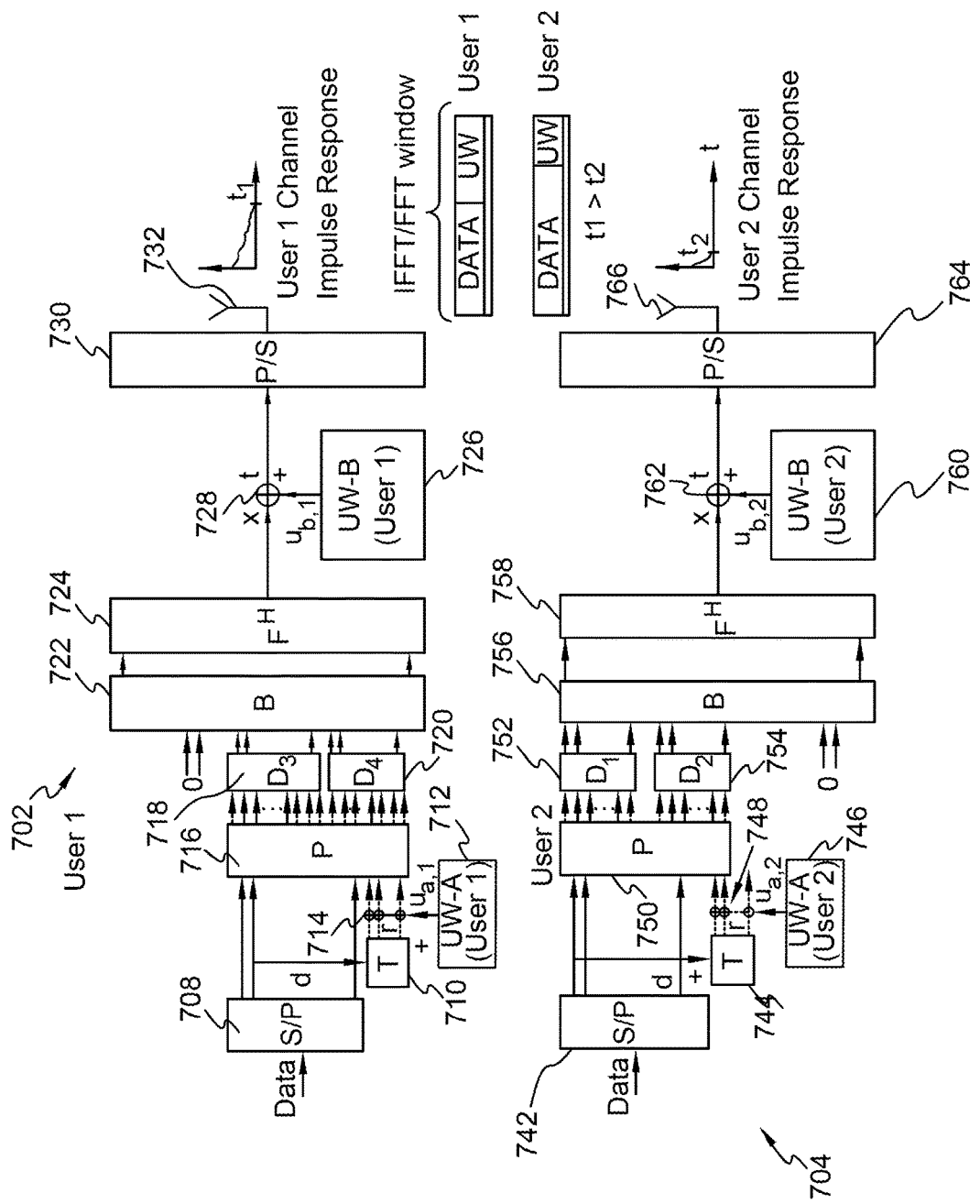
FIGS. 7A and 7B are illustrations of transmitters and an receiver utilizing uplink tail adaption and tail suppression.
Figure 7B:
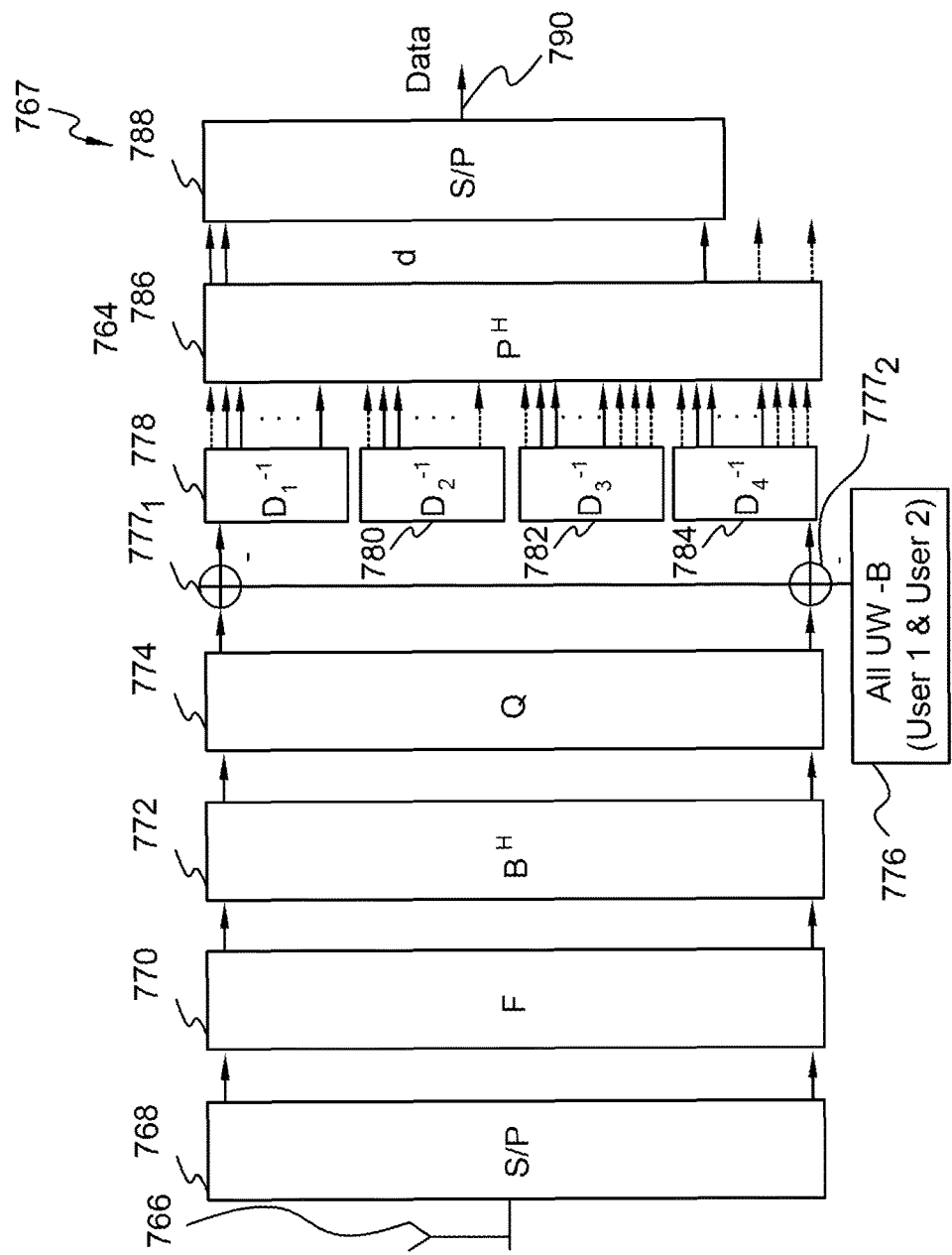

FIG. 7A is an illustration of transmitters 702 or 704 and FIG. 7B is illustration of a receiver 767 utilizing uplink tail adaption and tail suppression. The configurations for transmitters 702 or 704 with an adaptive tail size(s) may also be applied or utilized by transmitter 400. Moreover, at least part of the operation described for transmitter 400 may be utilized by transmitters 702 or 704. In the particular, signal vector x and signal t in transmitters 702 or 704 may be generated using the functions or operations described for transmitter 400.

Transmitter 702 or 704 may adjust a tail size(s) of transmissions based on channel delay spread, maximum excess delay spread metrics, distance, or any other metric that provides information about frequency selectivity, channel response, etc. of channels $H_1$ or $H_2$. Adjusting tail size(s) may improve spectral efficiency and utilize resources efficiently. For example, when user devices (e.g., user 1 and user 2 devices) experience different delay spreads, the uth user device may utilize tail size $N_{tail,u}$ for its symbol based on maximum excess delay spread, $L_u$, as $N_{tail,u} > L_u$, which may be translated into the following condition:

$$\frac{M_{tail,k,u}}{M_k} > \frac{N_{tail,u}}{N}, \qquad \text{Equation (12)}$$

where $M_{tail,k,u}$ is the length for DFT sub-spreading functions of the uth user device. Moreover, user 1 device transmitter 702 may experience a longer channel impulse than user 2 device transmitter 704. To reduce inter-symbol interference (ISI), user 1 device may be configured with a larger $M_{tail,3,1}$ and $M_{tail,4,1}$, compared to $M_{tail,1,2}$ and $M_{tail2,2}$.

In transmitter 702, vector(s) d, the output(s) of S/P function 708 generated using input data or a data stream, may be processed by tail suppression function 710 that utilizes precoding matrix T. Vector $u_{a,1}$ generated by UW-A function 712 may be added to vector(s) r at addition function(s) 714 in order to enhance or increase tail suppression prior to spreading. Vector $u_{a,1}$ may also be generated and utilized to provide a simpler receiver structure at receiver 767.

In transmitter 702, DFT sub-spreading matrices $D_3$ 718 and $D_4$ 720 may modulate data symbols using values generated by tail suppression function 710. Permutation matrix P 716 may be utilized to map modulation symbols and elements of suppressing vector(s) r to input(s) of the DFT sub-spreading matrices $D_3$ 718 and $D_4$ 720. Permutation matrix P 716 may be configured for interleaved or localized mappings of modulation symbols. Zero input(s) and output(s) of DFT sub-spreading matrices $D_3$ 718 and $D_4$ 720 may be replicated and shaped in the frequency domain by transmit (TX) shaping matrix function 722 to construct a matrix B for different pulse shapes in time. The zero inputs may allow multiple access and usage of the zeroed subcarrier(s) by other users by not transmitting data on those subcarrier(s) by user 1 device. Matrix B may map output(s) of DFT sub-spreading matrices $D_3$ 718 and $D_4$ 720 such that the result is a sinc function in the time domain. The result may be a sinc function due to the output of DFT sub-spreading matrices $D_3$ 718 and $D_4$ 720 being mapped to certain subcarriers, which correspond to a rectangular shape in the frequency domain.

Processed samples in frequency from outputs of DFT sub-spreading matrices $D_3$ 718 and $D_4$ 720 may be converted to the time domain by inverse DFT function 724 that utilizes matrix F to produce signal or output x. Once signal or output vector x is generated, unique word signal $u_{b,1}$ may be provided by UW-B function 726 and appended to signal vector x at addition function 728 to generate t to be transmitted using antenna 732 after parallel-to-serial conversion by P/S function 730. In transmitter 702, unique word signal $u_{b,1}$ may provide further tail suppression in the time domain to signal vector x after spreading and modulation.

For transmitter 704, vector(s) d, the output(s) of S/P function 742 generated using input data or a data stream, may be processed by tail suppression function 744 that utilizes precoding matrix T. Vector $u_{a,2}$ generated by UW-A function 746 may be added to vector(s) r at addition function(s) 748 in order generate a UW to enhance or increase tail suppression prior to spreading. Vector $u_{a,2}$ may also be generated and utilized to provide a simpler receiver structure at receiver 767.

In transmitter 704, DFT sub-spreading matrices $D_1$ 752 and $D_2$ 754 may modulate data symbols using values generated by tail suppression function 744. Permutation matrix P 750 may be utilized to map modulation symbols and elements of suppressing vector(s) r to input(s) of the DFT sub-spreading matrices $D_1$ 752 and $D_2$ 754. Permutation matrix P 750 may be configured for interleaved or localized mappings of modulation symbols. Zero input(s) and output(s) of DFT sub-spreading matrices $D_1$ 752 and $D_2$ 754 may be replicated and shaped in the frequency domain by transmit (TX) shaping matrix function 756 to construct a matrix B for different pulse shapes in time. The zero inputs may allow multiple access and usage of the zeroed subcarrier(s) by other users by not transmitting data on those subcarrier(s) by user 2 device. Matrix B may map output(s) of DFT sub-spreading matrices $D_1$ 752 and $D_2$ 754 such that the result is a sinc function in the time domain. The result may be a sinc function due to the output of DFT sub-spreading matrices $D_1$ 752 and $D_2$ 754 being mapped to certain subcarriers, which correspond to a rectangular shape in the frequency domain.

Processed samples in frequency from outputs of DFT sub-spreading matrices $D_1$ 752 and $D_2$ 754 may be converted to the time domain by inverse DFT function 758 that utilizes matrix F to produce signal or output vector x. Once signal or output vector x is generated, unique word signal $u_{b,2}$ may be provided by UW-B function 760 and appended to signal vector x at addition function 762 to generate t to be transmitted using antenna 766 after parallel-to-serial conversion by P/S function 764. In transmitter 704, unique word signal $u_{b,2}$ may provide further tail suppression in the time domain to signal vector x after spreading and modulation.

As shown in FIG. 7, user 1's Channel Impulse Response may require an adapted tail length of $\tau_1$ to reduce any potential ISI. As a result of user 2's Channel Impulse Response, an adapted tail length of $\tau_2$ may be required to reduce any potential ISI where $\tau_1 > \tau_2$. Thus, as shown in FIG. 7, user 1's UW is substantially larger or longer than user 2's UW.

Receiver 767 may perform substantially the reverse operations of transmitter 702 or 704. In addition, at least part of the operation described for receiver 500 may be utilized by receiver 767. Antenna 766 may receive transmissions from transmitter 702 or 704. Received signals are serial-to-parallel converted by S/P function 768 and processed by DFT F 770. The output(s) of DFT F 770 may be provided to receiver shaping matrix $B^H$ 772. When transmitted signal vector t passes through the multipath channel, any leakage between symbols may be reduced by frequency domain equalization by FDE 774 by using matrix Q. Subsequent to the equalization operation, the appended UW-B signal may be removed at subtraction functions $777_1$ and $777_2$ by calculating its response in the frequency domain by UW-B function 776. Sub-despreading matrices $D_1^{-1}$ to $D_4^{-1}$ 778, 780, 782, 784 may despread the outputs of subtraction functions $777_1$ and $777_2$ and communicate results to inverse or receiver permutation matrix 786 to recover data vector(s) d. Data vector(s) d may be serial-to-parallel converted by S/P function 788 to produce data 790.

Varying UW-A and UW-B sizes or signals based on channel delay spread, maximum excess delay spread metrics, distance, or any other metric that provides information about the frequency selectivity of the channels $H_1$ or $H_2$ may also be desirable. For either downlink or uplink transmissions, when different radio links or user devices use different UW sizes or types, signaling to receivers of used UW sizes, UW types, or the complete UW may be needed for cancelation, demodulation, equalization, error correction/detection, or the like. Signaling may be done inband, out of band, through RRC signaling, upper layer signaling, or the like. Information about permutation matrix P 406 or 716 may also be needed by receiver 500 or 767 so that the location of samples for tail suppression functions is known.

In addition, receiver 500 or 767 may acknowledge or provide compatible UW-A, UW-B, or any other UW configurations to any one of transmitters 400, 702, or 704 as receiver structure(s) may be dependent on UW configuration(s). Information about TX shaping matrix function 418, 722, or 756 may also be signaled to receiver 500 or 767, especially when different types of pulse shaping are utilized in a network. Signaling of UW type, UW size, shaping matrix function, or the like may be performed semi-statically such as at link establishment, when a channel is not expected to change significantly, when a channel is stable, or the like. Signaling may also be performed dynamically such as at every frame, every other frame, ever transmission time interval (TTI), every other TTI, or the like when a channel changes or varies.

Any one of transmitters 400, 702, or 704 may have transmission energy or power constraints. Optimization to minimize the energy of $M_{21}d + M_{22}r$ while limiting energy of vector $M_{22}r$ may be expressed as follows:

$$r = \underset{r'}{\operatorname{argmin}} \| M_{21}d + M_{22}r' \|_2^2 \quad \text{s.t.} \quad \| s' \|_2^2 \leq \alpha, \qquad \text{Equation (13)}$$

where $\alpha$ may be an energy constraint on vector s. The optimization problem above is known as a least squares with a quadratic inequality (LSQI) constraint. For an optimized solution, an unconstrained least squares problem or without an energy constraint may be also performed.

If $M_{21}d$ is in the range of the columns of $M_{22}$, Equation (13) may be a minimum norm problem. If $M_{21}d$ is not in the range of the columns of $M_{22}$, Equation (13) may be a minimum norm least square-error problem. In both cases, the solution may be expressed via the pseudoinverse of $M_{22}$ as $$r = \underset{T}{-M_{22}^\dagger M_{21}} \, d. \qquad \text{Equation (14)}$$

The solution for Equation (14) may be obtained as given above. If an energy constraint is introduced, Equation (6) may be equivalent to the following unconstrained problem:

$$r = \underset{r'}{\operatorname{argmin}} \| M_{21}d + M_{22}r' \|_2^2 + \lambda \| r' \|_2^2, \qquad \text{Equation (15)}$$

where $\lambda$ is the Lagrange multiplier. In this case, the solution may be obtained as $$r = \underset{T}{-(M_{22}^H M_{22} + \lambda I)^{-1} M_{22}^H M_{21} d}. \qquad \text{Equation (16)}$$

A proper Lagrange multiplier may be found for the case of $\|r'\|_2^2 = \alpha$, by using a search algorithm such as a bi-section search algorithm or the like, as desired.

Equation (14) may achieve tail suppression with a substantially perfect zero tail if the rank of $M_{22}$ is greater or equal to $N_{tail}$. Otherwise, a tail may have non-zero values with minimum energy of $M_{22}s$. If $M_{22}$ is ill-conditioned (e.g., the existence of guard subcarriers may cause an ill-conditioned $M_{22}$), the solution provided in Equation 16 may limit the energy of $M_{22}s$ and may yield a significant tail suppression with a proper selection of $\lambda$.

For configurations where a zero tail is generated without DFT-spreading, energy of redundant symbols in generating a zero tail may be high since this energy may be concentrated on a few predetermined or selected subcarriers. However, for the examples given herewith, redundant symbol energy may be spread across a data vector in frequency via multiple DFT-spread functions resulting in substantially low energy usage. In addition, specific inputs of DFT-spread functions, which may affect a particular tail, may be used for redundant symbols. Consumed energy for redundant symbols may depend on parameters that affect matrix T, such as $N_{tail}$, $N_r$, and $\lambda$.

Referring again to Equation (1), using the singular value decomposition theorem, the matrix T may be factorized as $$T = U\Sigma V^H, \quad \text{Equation (17)}$$

where U and V may be orthonormal matrices and $\Sigma$ may be a diagonal matrix. If large diagonal elements are utilized, a new suppression matrix $T_{new}$ may be obtained as $$T_{new} = U\tilde{E}V^H, \quad \text{Equation (18)}$$

where $\tilde{E}$ may be a diagonal matrix that contains large elements of $\Sigma$. As $T_{new}$ is generated based on some of the columns of matrix V and matrix U, i.e., the principle components, $T_{new}$ may yield a simpler transmitter 400, 702, or 704 or receiver 500 or 767 architecture as compared to original matrix T.

Certain types of transmissions (e.g., DFT-S-OFDM) may be configured with small elements for matrix T. For example, if N=512 (64 of 512 may be the guard subcarriers), and $M_k$=56|$\forall$k, the amplitude of elements of matrix T $\in$ $\mathbb{C}^{64 \times 384}$ may be small. Operation of r=Td may be simplified small elements for matrix T by considering dominant entries of matrix T. Dominant entries of matrix T may be identified by hard thresholding by utilizing Equation (14), Equation (16), or any another optimization operation. Entries of matrix T may be set to zeroes if their values are less than a certain threshold. Moreover, dominant entries for matrix T may also be obtained, identified, and optimized by using certain entries of matrix T.

Multiple suppression matrices may be utilized for matrix T. Matrix T may be constrained to be a block diagonal matrix as $$T = \text{diag}\{T_{small,1}, T_{small,2}, \ldots T_{small,\ell}, \ldots T_{small,P}\}, \quad \text{Equation (19)}$$

where diag{·} is the diagonalization operator. The values of submatrices may be obtained via Equation (14), Equation (16), or another optimization strategy. Since submatrix $T_{small,\ell}$ may be smaller than the original matrix T, computation or processing operations may be simpler for any one of transmitters 400, 702, or 704 or receivers 500 or 767.

Submatrices $T_{small,1}$, $T_{small,2}$, ... $T_{small,\ell}$, ..., and $T_{small,P}$ may be designed based on single DFT-spread functions, multiple DFT-spread functions, individual DFT-spread functions, or the like. In addition, optimization may be constrained to be $T_{small,1} = T_{small,2} = \ldots = T_{root}$ in order to calculate redundant symbols by using a single matrix $T_{root}$. For example, when two adjacent DFT-spread functions are considered for matrix $T_{root}$, the size of $T_{root}$ may be 16×96 when DFT size is 56 (each has inputs for 8 redundant symbols and 48 data symbols) and $T_{root}$ may be used for the calculation of redundant symbols.

Figure 8:
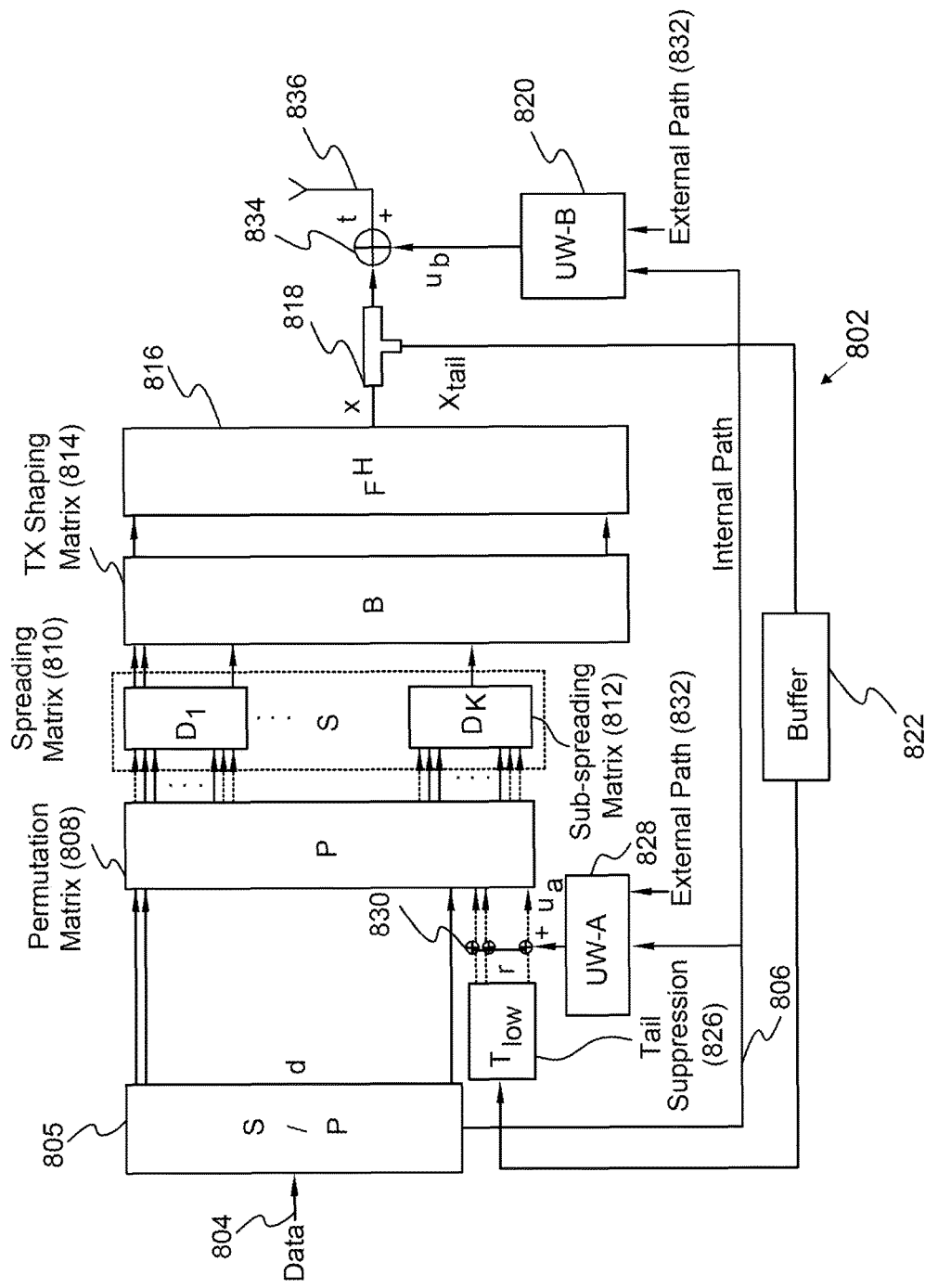
FIG. 8 is an illustration of UW-DFT-S-OFDM communications utilizing buffering with tail suppression.

FIG. 8 is an illustration of UW-DFT-S-OFDM communications utilizing buffering with tail suppression. Although shown for transmitter 802, FIFO buffering may be similarly utilized in any one of transmitters 400, 702, or 704. In transmitter 802, low tail suppression function 826 that utilizes precoding matrix $T_{low}$ may use buffered data to generate vector(s) r. Vector $u_a$ generated by UW-A function 828 may be added to vector(s) r at addition function(s) 830 in order generate a UW substantially prior to spreading.

In transmitter 802, DFT sub-spreading matrices $D_1 \ldots D_K$ may modulate data symbols using values generated by tail suppression function 826. Permutation matrix P 808 may be utilized to map modulation symbols and elements of suppressing vector(s) r to input(s) of the DFT spreading matrix 810 having DFT sub-spreading matrices $D_1 \ldots D_K$ 812 to compose matrix S. Permutation matrix P 808 may be configured for interleaved or localized mappings of modulation symbols. Output(s) of DFT sub-spreading matrices $D_1 \ldots D_K$ may be replicated and shaped in the frequency domain by transmit (TX) shaping matrix function 814 to construct a matrix B for different pulse shapes in time. Matrix B may map output(s) of DFT sub-spreading matrices $D_1 \ldots D_K$ such that the result is a sinc function in the time domain. The result may be a sinc function due to the output of DFT sub-spreading matrices $D_1 \ldots D_K$ being mapped to certain subcarriers, which may correspond to a rectangular shape in the frequency domain.

Processed samples in frequency from outputs of DFT sub-spreading matrices $D_1 \ldots D_K$ may be converted to the time domain by inverse DFT 816 that utilizes matrix F to produce signal or output x. At function 818, the tail $x_{tail}$ of signal or output x may be feed to buffer 822. Buffer 822 may be configured as a first-in first-out (FIFO) buffer or the like. Buffer 822 may subsequently provide $x_{tail}$ to low tail suppression function 826. Once signal vector x is generated, unique word signal $u_b$ may provided by UW-B function 820 and appended to signal vector x at addition function 834 to generate t to be transmitted utilizing antenna 836.

The matrix T in Equation (14) and Equation (16) may be factorized as $T = f(M_{22}) \times M_{21} \in \mathbb{C}^{N_r \times N_d}$ where $f(M_{22}) \in \mathbb{C}^{N_r \times N_{tail}}$ is a function that may determine tail suppression and $M_{21} \in \mathbb{C}^{N_{tail} \times N_d}$ is the matrix that may extract the tail of the original DFT-S-OFDM symbol. Since the tail of the original symbol, i.e., $M_{21}d$, may be calculated without suppression operations, $M_{21}$ for matrix T may not be needed. For example, the tail of the original DFT-S-OFDM symbol may be generated without a suppression operation and the tail may be buffered using buffer 822. Redundant symbols may subsequently be calculated based on values in buffer 822.

Since calculation of redundant symbols may be related to $f(M_{22})$ and the value on the tail, the size of the matrix that calculates the redundant symbols, i.e., $T_{low}$, may become $N_r \times N_d$. For example, considering the solution provided in Equation (14) and Equation (16), $T_{low}$ may be obtained as $$T_{low} = -M_{22}^{\dagger} \quad \text{Equation (20)}$$

and $$T_{low} = -(M_{22}^H M_{22} + \lambda I)^{-1} M_{22}^H. \quad \text{Equation (21)}$$

In addition to equations (20) and (21), a pipelining architecture of data may be utilized to determine $T_{low}$.

Still referring to FIG. 8, UW vectors $u_a$ and $u_b$ may be generated adaptively based on data 804 by using internal path 806 to UW-A function 828 or UW-B function 820. Vector $u_b$ may also be based on a predetermined table known or exchanged between transmitter 802 and a destination receiver. $u_b$ may also be generated based on the decision in the upper layers, or generated by UW-B function 820 using external data by external path 832. UW vectors $u_a$ and $u_b$ may also be fixed to generate a certain sequence such as a Golay sequence as in IEEE 802.11ad or the like. Various UWs for different users/streams (including multiple antennas) may also be used to distinguish users by transmitter 802.

Table 1 is an overhead analysis comparison of unique word single carrier (UW-SC), CP-SC, CP-OFDM, ZT DFT-S-OFDM, UW-OFDM, and UW-DFT-S-OFDM as given in FIGS. 4-7. In table, N=512 subcarriers, CP length of 64 samples, UW fixed as $N_{tail}$=64 samples, and K=8 identical DFT sub-spreading functions where $M_k$=64 for k=1, 2, . . . , 8 may be configured. For each DFT sub-spreading function $M_{tail,k}$=8 and $M_{header,k}$=1, may yield $N_r$=K×($M_{tail,k}$+$M_{header,k}$)=72 samples. For UW, a π/2-binary phase shift keying (BPSK) Golay A 128 sequence, which may be defined as the UW for SC in IEEE 802.11ad, is considered.

For the analysis and results shown in Table 1, a multipath Rayleigh fading channel with L independent taps may be assumed. The analysis also considers an exponential power delay profile (PDP) such that the unnormalized power of the $\ell$ th tap is expressed as exp $(-\tau\ell)$, where $\tau$ corresponds to the decaying rate. It should be noted that τ=0 may yield a uniform power delay profile (PDP). As shown in Table 1, UW-DFT-S-OFDM transmission as given in FIGS. 4-7 may have better performance than UW-SC with a similar resource usage efficiency.

Figure 10:
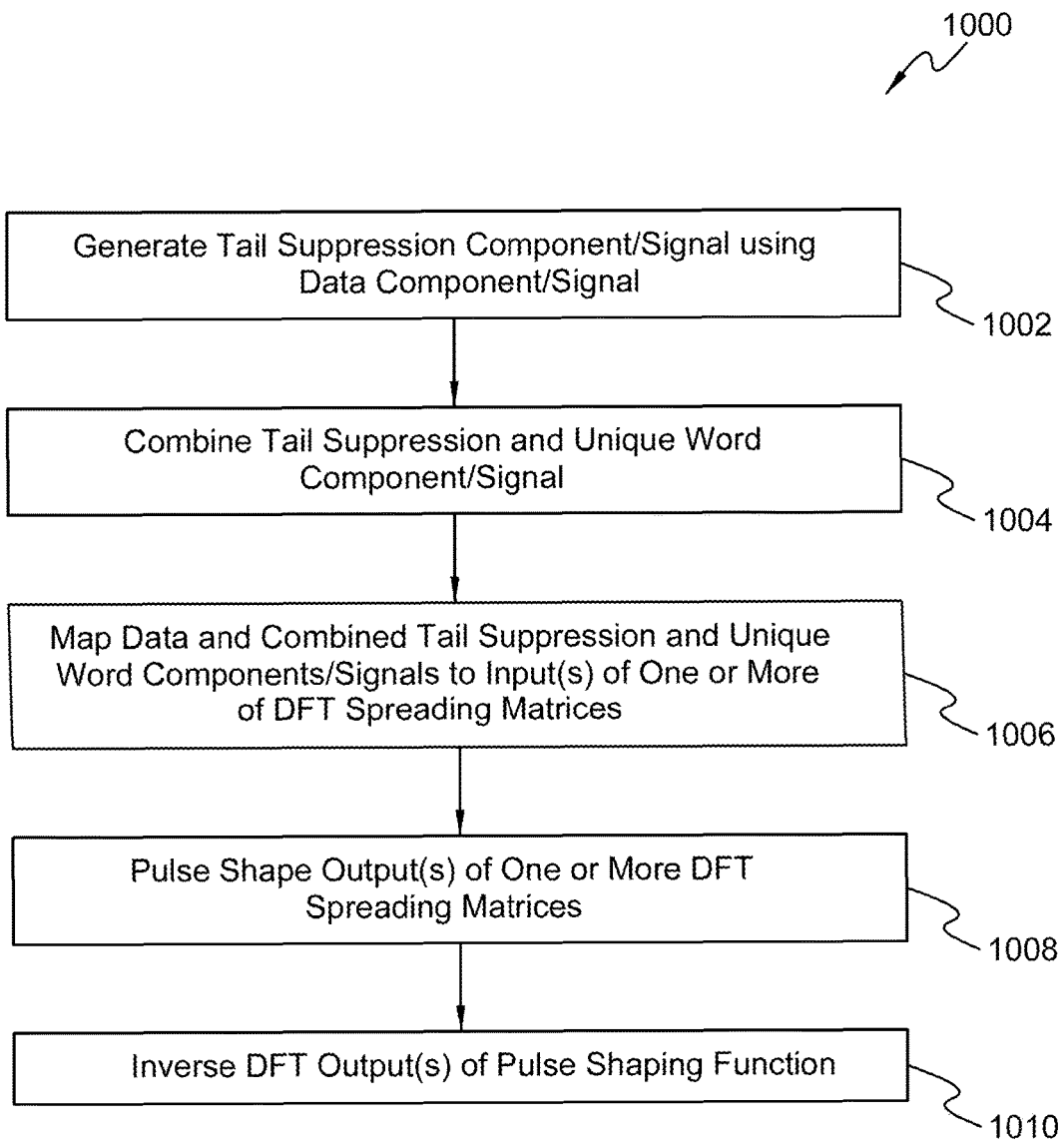
FIG. 10 is a process of tail suppression of a symbol.

FIG. 10 is a process 1000 of tail suppression of a symbol. A tail suppression component or signal may be generated using a data component or signal (1002). The tail suppression component or signal may be combined with a unique word component or signal (1004). The data and combined tail suppression and unique word components or signals may be mapped to input(s) of one or more DFT spreading matrices (1006). Pulse shaping the output(s) of the one or more DFT spreading matrices may be performed (1008). The output(s) of the pulse shaping function may be processed by an inverse DFT (1010).

Although process 1000 combines a tail suppression component or signal with a unique word component or signal and pulse shapes the output(s) of the one or more DFT spreading matrices, process 1000 may be performed without these elements. For instance, the data and tail suppression component or signal may be mapped to input(s) of one or more DFT spreading matrices without the use of a unique word. In addition, the output(s) of the one or more DFT spreading matrices may be processed by an inverse DFT without any pulse shaping operations.

TABLE 1

Overhead Analysis Comparison

|  | UW-SC | CP-SC | CP-OFDM | ZT-DFT-S-OFDM | UW-OFDM | UW-DFT-S-OFDM (FIGS. 4-7) |
|---|---|---|---|---|---|---|
| Data Subcarriers | 448 | 512 | 512 | 440 | 448 | 440 |
| Redundant Subcarriers | — | — | — | 8 + 64 | 64 | 8 + 64 |
| CP size | — | 64 | 64 | — | — | — |
| Efficiency | 448/512 = 87.5% | 512/(512 + 64) = 88.9% | 512/(512 + 64) = 88.9% | 440/512 = 85.9% | 448/512 = 87.5% | 440/512 = 85.9% |

Figure 9:
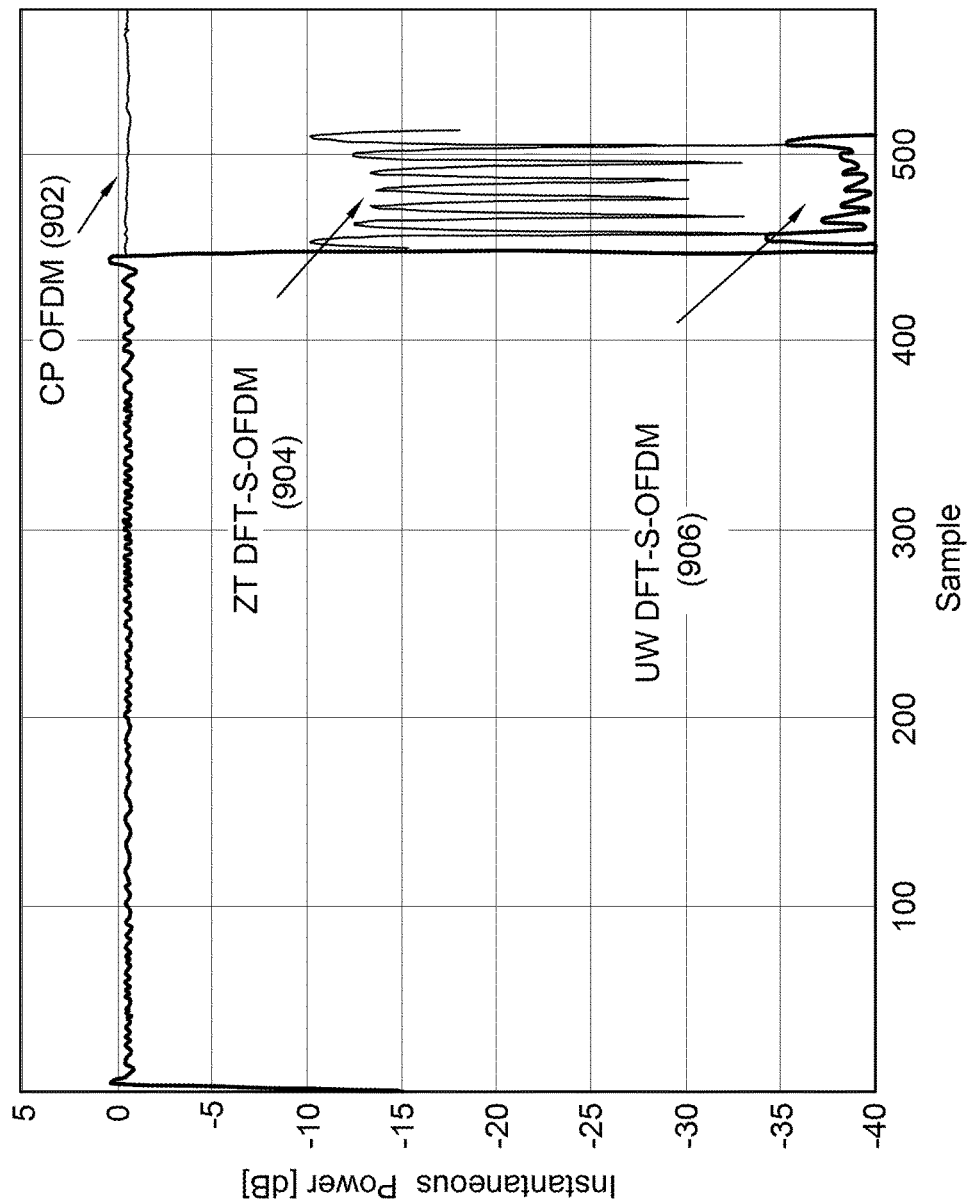
FIG. 9. is an illustration of energy distribution in time of waveforms when the UW is a zero sequence.

FIG. 9. is an illustration of energy distribution in time of waveforms when a UW is a zero sequence. In FIG. 9, an example of the instantaneous power vs. samples for CP-OFDM waveform 902, ZT DFT-S-OFDM waveform 904, and UW DFT-S-OFDM waveform 906 as given in FIGS. 4-7 is shown. For the waveforms in FIG. 9, the number of subcarriers N is set to 512, L=448 (i.e., 32 guard subcarriers at the edges of the band), and a CP length of 64 samples is used. The length of UW may be fixed as $N_{tail}$=64 samples. In the graph K=8 identical DFT spreading blocks where $M_k$=56 for k=1, 2, . . . , 8 may be utilized. For each DFT-spread block, $M_{tail,k}$=7 and $M_{header,k}$=1 may be utilized, which may yield $N_r$=K×($M_{tail,k}$+$M_{header,k}$)=64 redundant symbols.

For the comparison of various tails of schemes in FIG. 9, the UW signal is not included. CP OFDM waveform 902 may utilize 512+64 samples in time, while ZT DFT-S-OFDM waveform 904 and UW DFT-S-OFDM waveform 906 may be configured to utilize 512 samples. UW DFT-S-OFDM waveform 906 may achieve substantially suppressed samples at tails of DFT-S-OFDM symbols, such as between samples 450 to 500, compared to the ZT DFT-S-OFDM waveform 904. In this example, since the power of the tail part is approximately 15 dB lower than that of a non-tail part for ZT DFT-S-OFDM waveform 904 and changes may depend on data, ISI may be desirably limited for this scheme in a rich scattering environment. However, in UW DFT-S-OFDM waveform 906 as given in FIGS. 4-7, a tail part may be 35-40 dB lower than a non-tail part for added suppression compared to ZT DFT-S-OFDM waveform 904.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU) comprising:
   a processor configured to generate a first signal that utilizes a tail suppression signal generated at the WTRU from a data stream and utilizes a first unique word signal;
   the processor further configured to map elements of the data stream and the first signal to one or more discrete Fourier transform spread (DFT-S) functions;

the processor further configured to perform an inverse DFT operation on symbols generated by the one or more DFT-S functions to generate a second signal; and a transceiver configured to transmit the second signal.

2. The WTRU of claim 1, wherein the symbols generated by the one or more DFT-S functions are shaped prior to the inverse DFT operation.

3. The WTRU of claim 1, wherein a second unique word signal is added to the second signal prior to the transmission.

4. The WTRU of claim 3, wherein the first unique word signal or the second unique word signal is based on the data stream.

5. The WTRU of claim 3, wherein the first unique word signal is associated with a length based on an estimated channel impulse response.

6. The WTRU of claim 1, wherein the one or more DFT-S functions comprise a first group of DFT-S functions and a second group of DFT-S functions and wherein the first signal is mapped to the first group of DFT-S functions.

7. The WTRU of claim 1, wherein the tail suppression signal is based on a previous tail buffered by the WTRU.

8. A method performed by a wireless transmit/receive unit (WTRU), the method comprising:

generating, by the WTRU, a first signal utilizing a tail suppression signal generated at the WTRU from a data stream and utilizing a first unique word signal;

mapping, by the WTRU, elements of the data stream and the first signal to one or more discrete Fourier transform spread (DFT-S) functions;

performing, by the WTRU, an inverse DFT operation on symbols generated by the one or more DFT-S functions to generate a second signal; and transmitting, by the WTRU, the second signal.

9. The method of claim 8, wherein the symbols generated by the one or more DFT-S functions are shaped prior to the inverse DFT operation.

10. The method of claim 8, wherein a second unique word signal is added to the second signal prior to the transmitting.

11. The method of claim 10, wherein the first unique word signal or the second unique word signal is based on the data stream.

12. The method of claim 10, wherein the first unique word signal is associated with a length based on an estimated channel impulse response.

13. The method of claim 8, wherein the one or more DFT-S functions comprise a first group of DFT-S functions and a second group of DFT-S functions and wherein the first signal is mapped to the first group of DFT-S functions.

14. The method of claim 8, wherein the tail suppression signal is based on a previous tail buffered by the WTRU.

15. A network device comprising:

a processor configured to generate a first signal that utilizes a tail suppression signal generated at the WTRU from a data stream and utilizes a first unique word signal;

the processor further configured to map elements of the data stream and the first signal to one or more discrete Fourier transform spread (DFT-S) functions;

the processor further configured to perform an inverse DFT operation on symbols generated by the one or more DFT-S functions to generate a second signal; and a transceiver configured to transmit the second signal.

16. The network device of claim 15, wherein the symbols generated by the one or more DFT-S functions are shaped prior to the inverse DFT operation.

17. The network device of claim 15, wherein a second unique word signal is added to the second signal prior to the transmission.

18. The network device of claim 17, wherein the first unique word signal or the second unique word signal is based on the data stream.

19. The network device of claim 17, wherein the first unique word signal is associated with a length based on an estimated channel impulse response.

20. The network device of claim 15, wherein the one or more DFT-S functions comprise a first group of DFT-S functions and a second group of DFT-S functions and wherein the first signal is mapped to the first group of DFT-S functions.

* * * * *

UNITED STATES PATENT AND TRADEMARK OFFICE
CERTIFICATE OF CORRECTION

PATENT NO. : 10,129,065 B2
APPLICATION NO. : 15/742329
DATED : November 13, 2018
INVENTOR(S) : Alphan Sahin et al.

It is certified that error appears in the above-identified patent and that said Letters Patent is hereby corrected as shown below:

In the Claims

In Claim 15, at Column 24, Line 12, after the word "at", delete "the WTRU" and insert therefor --a wireless transmit/receive unit (WTRU)--.

Signed and Sealed this
Thirtieth Day of July, 2019

Andrei Iancu
*Director of the United States Patent and Trademark Office*